United States Patent
Akkaya et al.

(10) Patent No.: US 9,234,790 B2
(45) Date of Patent: Jan. 12, 2016

(54) APPARATUS AND METHODS UTILIZING OPTICAL SENSORS OPERATING IN THE REFLECTION MODE

(71) Applicant: The Board of Trustees of the Leland Stanford Junior University, Palo Alto, CA (US)

(72) Inventors: Onur Can Akkaya, Palo Alto, CA (US); Onur Kilic, Mountain View, CA (US); Michel J. F. Digonnet, Palo Alto, CA (US); Gordon Kino, Stanford, CA (US); Olav Solgaard, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 260 days.

(21) Appl. No.: 13/839,437

(22) Filed: Mar. 15, 2013

(65) Prior Publication Data

US 2013/0292555 A1 Nov. 7, 2013

Related U.S. Application Data

(60) Provisional application No. 61/612,831, filed on Mar. 19, 2012.

(51) Int. Cl.
 *G01J 1/04* (2006.01)
 *G01H 9/00* (2006.01)
 *G01D 5/353* (2006.01)
 (Continued)

(52) U.S. Cl.
 CPC ............ *G01J 1/0425* (2013.01); *G01D 5/3539* (2013.01); *G01D 5/35312* (2013.01); *G01D 5/35367* (2013.01); *G01D 5/35387* (2013.01); *G01H 9/004* (2013.01); *G01V 8/14* (2013.01); *G01V 8/16* (2013.01); *G01V 8/22* (2013.01); *G01V 8/24* (2013.01)

(58) Field of Classification Search
CPC combination set(s) only.
See application file for complete search history.

(56) References Cited

U.S. PATENT DOCUMENTS

| 5,696,857 A | 12/1997 | Frederick |
| 6,034,924 A | 3/2000 | Vakoc |

(Continued)

FOREIGN PATENT DOCUMENTS

| JP | 2001-099702 | 4/2001 |
| WO | WO 00/62021 | 10/2000 |

OTHER PUBLICATIONS

Search and Examination Report for Application No. GB1304972.1 dated Jun. 20, 2013.

(Continued)

*Primary Examiner* — Francis M Legasse, Jr.
(74) *Attorney, Agent, or Firm* — Knobbe, Martens, Olson & Bear, LLP

(57) ABSTRACT

Optical apparatus and methods utilizing sensors operating in the reflection mode are provided. The apparatus includes at least one optical bus. The at least one optical bus is configured to be optically coupled to at least one source of input optical signals, to at least one optical detector, and to a plurality of reflective sensing elements. The at least one optical bus transmits an input optical signal from the at least one source to the plurality of reflective sensing elements. At least one reflective sensing element of the plurality of reflective sensing elements receives a portion of the input optical signal and reflects at least a portion of the received portion. The at least one optical bus transmits the reflected portion to the at least one optical detector.

25 Claims, 33 Drawing Sheets

(51) Int. Cl.
  *G01V 8/14* (2006.01)
  *G01V 8/16* (2006.01)
  *G01V 8/22* (2006.01)
  *G01V 8/24* (2006.01)

(56) References Cited

U.S. PATENT DOCUMENTS

| | | | |
|---|---|---|---|
| 6,084,233 | A | 7/2000 | Hodgson et al. |
| 6,097,486 | A | 8/2000 | Vakoc et al. |
| 6,252,689 | B1 * | 6/2001 | Sharp .................... 398/168 |
| 6,282,334 | B1 | 8/2001 | Hodgson et al. |
| 7,526,148 | B2 | 4/2009 | Kilic et al. |
| 7,619,743 | B2 | 11/2009 | Digonnet et al. |
| 7,630,589 | B2 | 12/2009 | Kilic et al. |
| 7,881,565 | B2 | 2/2011 | Kilic et al. |
| 2007/0103692 | A1 | 5/2007 | Hall et al. |

OTHER PUBLICATIONS

O.C. Akkaya et al., "Modeling and Demonstration of Thermally Stable High-Sensitivity Reproducible Acoustic Sensors," J. of Microelectromechanical Systems, vol. 21, No. 6, 2012.

O.C. Akkaya et al., "Time-Division-Multiplexed Interferometric Sensor Arrays," J. of Lightwave Tech., vol. 31, issue 16, pp. 2701-2708 (2013).

J. A. Bucaro, H.D. Dardy, and E.F. Carome, "Fiber-optic hydrophone," J. Acoust. Soc. Am. vol. 62, 1302 (1977).

J.A. Bucaro et al., "Miniature, High Performance, Low-Cost Fiber Optic Microphone," J. Acoust. Soc. Am., vol. 118, No. 3, part 1, pp. 1406-1413 (Sep. 2005).

J. H. Cole, R. L. Johnson, and P.G. Bhuta, "Fiber-optic detection of sound," J. Acoust. Soc. Am. vol. 62, 1136 (1977).

Examination Report for UK Patent Application No. 1304972.1 dated Jul. 8, 2015 in 4 pages.

T.K. Gangopadhyay et al., "Modeling and Analysis of an Extrinsic Fabry-Perot Interferometer Cavity," Appl. Optics, vol. 44, No. 16, pp. 312-3196 (Jun. 1, 2005).

K. Kadirvel et al., "Design and Characterization of MEMS Optical Microphone for Aeroacoustic Measurement," 42nd AIAA Aerospace Sciences Meeting and Exhibit, Jan. 5-8, 2004, Reno, Nevada.

H.K. Kim, V. Dangui, M. Digonnet, and G. Kino, "Fiber-optic gyroscope using an air-core photonic-bandgap fiber," Proceedings of the SPIE, vol. 5855, No. 1, pp. 198-201 (2005).

P.J. Kuzmenko, "Experimental Performance of a Miniature Fabry-Perot Fiber Optic Hydrophone," Proceedings of 8th Optical Fiber Sensors Conference, Monterey, California, Jan. 29-31, 1992, pp. 354-357.

W.B. Spillman, Jr. et al., "Moving Fiber-Optic Hydrophone," Optics Lett., vol. 5, No. 1, pp. 30-31 (Jan. 1980).

K. Totsu et al., "Ultra-Miniature Fiber-Optic Pressure Sensor Using White Light Interferometry," J. Micromech. Microeng., vol. 15, pp. 71-75 (2005).

M. Yu et al., "Acoustic Measurements Using a Fiber Optic Sensor System," J. Intelligent Mat'l Systems and Structures, vol. 14, pp. 409-414 (Jul. 2003).

* cited by examiner

APPARATUS AND METHODS UTILIZING OPTICAL SENSORS OPERATING IN THE REFLECTION MODE

CROSS-REFERENCE TO RELATED APPLICATIONS

This application claims the benefit of priority to U.S. Provisional Appl. No. 61/612,831, filed Mar. 19, 2012, and incorporated in its entirety by reference herein.

BACKGROUND

1. Field

This application relates generally to optical apparatus and methods utilizing sensors, more particularly sensors operating in the reflection mode.

2. Description of the Related Art

Fiber-optic acoustic sensors have been extensively researched since their first emergence in the 1970s (see, e.g., J. H. Cole, R. L. Johnson, and P. G. Bhuta, "*Fiber-optic detection of sound*," J. Acoust. Soc. Am. Vol. 62, 1136 (1977); J. A. Bucaro, H. D. Dardy, and E. F. Carome, "*Fiber-optic hydrophone*," J. Acoust. Soc. Am. Vol. 62, 1302 (1977)), largely because of their multiple advantages over conventional acoustic sensors. These advantages include small size and weight, ability to operate in chemically and/or electrically harsh environments, ease of multiplexing large numbers of sensors together, and compatibility with fiber-optic networks for data transport and processing.

Various fiber optic sensor systems have been previously disclosed that provide acoustic pressure measurements based on the relative displacements of the two mirrors of a Fabry-Perot interferometric cavity. See, e.g., M. Yu et al., "*Acoustic Measurements Using a Fiber Optic Sensor System*," J. Intelligent Mat'l Systems and Structures, vol. 14, pages 409-414 (July 2003); K. Totsu et al., "*Ultra-Miniature Fiber-Optic Pressure Sensor Using White Light Interferometry*," J. Micromech. Microeng., vol. 15, pages 71-75 (2005); W. B. Spillman, Jr. et al., "*Moving Fiber-Optic Hydrophone*," Optics Lett., vol. 5, no. 1, pages 30-31 (January 1980); K. Kardirvel et al., "*Design and Characterization of MEMS Optical Microphone for Aeroacoustic Measurement*," 42nd AIAA Aerospace Sciences Meeting and Exhibit, 5-8 Jan. 2004, Reno, Nev.; J. A. Bucaro et al., "*Miniature, High Performance, Low-Cost Fiber Optic Microphone*," J. Acoust. Soc. Am., vol. 118, no. 3, part 1, pages 1406-1413 (September 2005); T. K. Gangopadhyay et al., "*Modeling and Analysis of an Extrinsic Fabry-Perot Interferometer Cavity*," Appl. Optics, vol. 44, no. 16, pages 312-3196 (1 Jun. 2005); and P. J. Kuzmenko, "Experimental Performance of a Miniature Fabry-Perot Fiber Optic Hydrophone," Proceedings of 8th Optical Fiber Sensors Conference, Monterey, Calif., Jan. 29-31, 1992, pages 354-357.

By using optical apparatus or methods utilizing all-fiber sensors, it is possible to obtain information at a remote location. For example, high sensitivity, high dynamic range acoustic sensors can be multiplexed with these apparatus and by using these methods. Applications of apparatus and methods utilizing optical sensors include, but are not limited to, military sonar arrays, seismic surveying arrays, smart wells (monitoring down-hole environment), harbor and airport monitoring, anti-submarine warfare, and structural health management for aerospace vehicles. Apparatus and methods using fiber-optic sensors are advantageous over conventional sensor technologies. For example, they are electrically passive and immune to electromagnetic interference. They are lighter, cheaper, and smaller. They can also be integrated to existing telecommunications infrastructure for high speed data transfer. Moreover, it becomes possible to multiplex a large number of sensors with improved signal-to-noise ratio performance and improved noise figure performance compared to conventional technologies.

DETAILED DESCRIPTION

Optical sensors recently developed operate in the reflection mode, i.e., the same fiber that delivers the optical signal to the sensor also carries the modulated signal from the sensor towards the detector. Examples include the miniature Fabry-Perot (FP) interferometers described in U.S. patent application Ser. No. 11/414,506 filed Apr. 28, 2006, Ser. No. 11/604,673 filed Nov. 27, 2006, and Ser. No. 11/971,714 filed Jan. 9, 2008, each of which is incorporated in its entirety by reference herein. A number of apparatus and methods for sensors that deliver input and output signals on a different fiber has been described. See, e.g., U.S. Pat. No. 6,034,924, U.S. Pat. No. 6,084,233, and U.S. Pat. No. 6,097,486, which are incorporated in their entireties by reference herein. Certain embodiments described herein describe apparatus and methods utilizing optical sensors operating in the reflection mode.

Figure 1A:
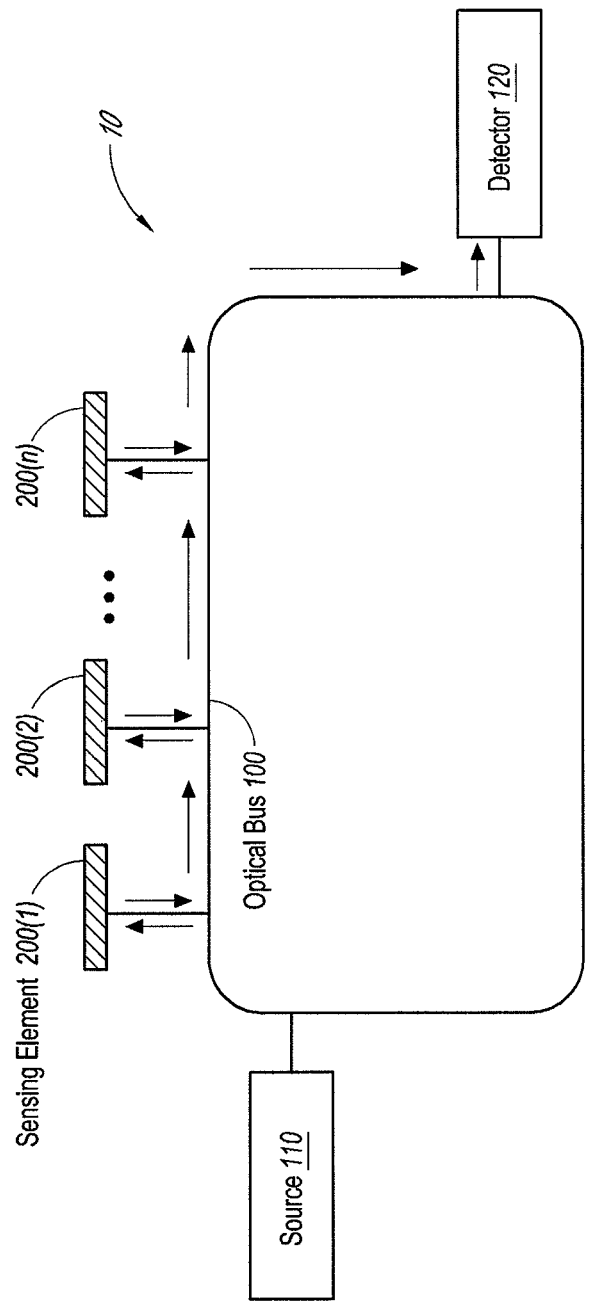
FIG. 1A schematically illustrates an example of an optical apparatus utilizing sensors operating in the reflection mode in accordance with certain embodiments described herein.

FIG. 1A schematically illustrates an example optical apparatus 10 utilizing sensors operating in the reflection mode in accordance with certain embodiments described herein. The apparatus 10 of certain embodiments comprises at least one optical bus 100. The at least one optical bus 100 is configured to be optically coupled to at least one source 110 of input optical signals, to at least one optical detector 120, and to a plurality of reflective sensing elements 200. The at least one optical bus 100 transmits an input optical signal from the at least one source 110 to the plurality of reflective sensing elements 200. At least one reflective sensing element 200(1) of the plurality of reflective sensing elements 200 receives a portion of the input optical signal and reflects at least a portion of the received portion. The at least one optical bus 100 transmits the reflected portion to the at least one optical detector 120.

In certain embodiments, the optical apparatus 10 is an optical sensor array, an example of which is schematically illustrated in FIG. 1A. The optical apparatus 10 of certain embodiments comprises at least one source 110 of input optical signals, at least one optical detector 120, a plurality of reflective sensing elements 200, and at least one optical bus 100. The at least one optical bus 100 is optically coupled to the at least one source 110 of input optical signals, to the at least one optical detector 120, and to the plurality of reflective sensing elements 200. The at least one optical bus 100 transmits an input optical signal from the at least one source 110 to the plurality of reflective sensing elements 200. Each reflective sensing element 200(1), 200(2), ... 200(n) of the plurality of reflective sensing elements 200 receives a portion of the input optical signal and reflects at least a portion of the received portion. The at least one optical bus 100 then transmits the reflected portions to the at least one optical detector 120.

Examples of sources compatible with certain embodiments described herein include, but are not limited to, monochromatic sources (e.g., laser, laser diode), broadband sources (e.g., incandescent lamp, light-emitting diode), and tunable sources (e.g., tunable laser). However, it can be any source well known in the art or yet to be devised.

In certain embodiments, the at least one source 110 of input optical signals is a laser signal source. For example, it can be a narrow linewidth laser diode. In addition, it can be a pulsed laser source or a continuous wave laser source followed by an optical modulator to generate a pulsed input signal to be fed into the at least one optical bus 100.

In certain embodiments, the at least one optical detector 120 may be one of a variety of photodetectors well known in the art, although detectors yet to be devised may be used as well. In certain embodiments, optical or electrical gates can be used just prior to the at least one optical detector 120 (e.g., at the output of the array) to select particular optical pulses from the pulse train corresponding to a particular sensing element 200 (e.g., for demodulation purposes). The gate can be synchronized with an input intensity modulator at the input to the apparatus 10 (e.g., at or immediately following the source 110).

Figure 1B:
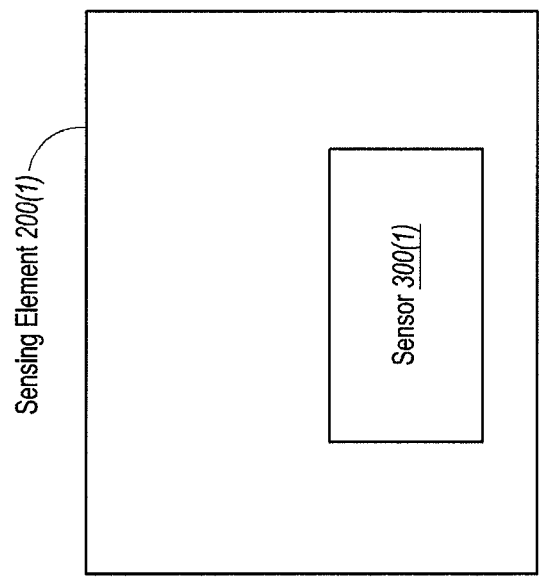
FIG. 1B schematically illustrates a reflective sensing element including at least one sensor in accordance with certain embodiments described herein.

As schematically illustrated in FIG. 1B, the at least one reflective sensing element 200(1) includes at least one sensor 300(1). The at least one sensor 300(1) can be a miniature Fabry-Perot (FP) interferometer, or any sensor operating in the reflection mode. The at least one sensor 300(1) receives at least one portion of the input optical signal. The at least one portion of the input optical signal is modulated by the measurand to which the at least one sensor 300(1) is designed to be sensitive. The at least one sensor 300(1) reflects at least a portion of the received portion, so that the reflected portion is an information-carrying signal. This information-carrying reflected portion is fed into the at least one optical detector 120 via the at least one optical bus 100.

In certain embodiments, the at least one optical bus 100 comprises at least one conventional optical fiber (e.g., a single-mode fiber such as the SMF-28® optical fiber available from Corning, Inc. of Corning, N.Y.). In certain other embodiments, the optical bus 100 comprises at least one air-core optical fiber (e.g., a hollow-core photonic bandgap fiber such as the HC-1550-02 optical fiber available from Crystal Fibre A/S of Birkerod, Denmark). In certain embodiments, the air-core optical fiber advantageously provides a reduction of one or more of the Kerr effect, the Faraday effect, and the Shupe (thermal) effect, as compared to conventional optical fibers. See, e.g., U.S. Pat. Appl. Publ. No. 2008/0030741 A1 and H. K. Kim, V. Dangui, M. Digonnet, and G. Kino, "Fiber-optic gyroscope using an air-core photonic-bandgap fiber," Proceedings of the SPIE, vol. 5855, no. 1, pp. 198-201 (2005), each of which is incorporated in its entirety by reference herein.

Figure 2:
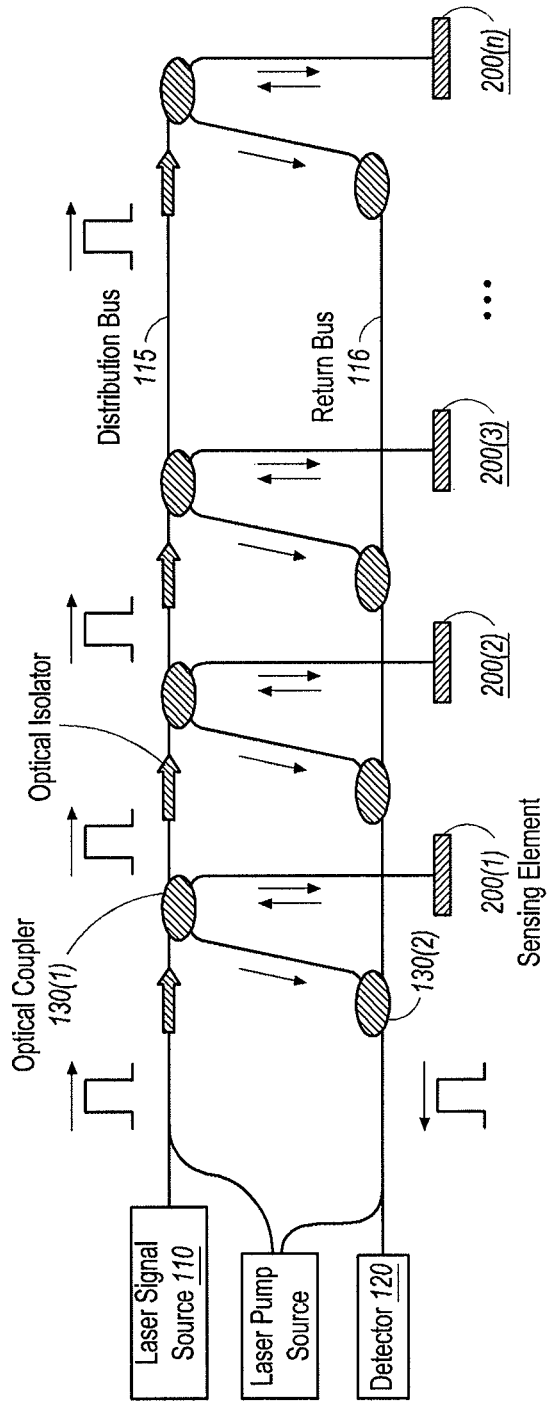
FIGS. 2-4 schematically illustrate examples of an optical bus comprising a distribution bus and a return bus optically coupled to a plurality of reflective sensing elements in accordance with certain embodiments described herein.

In certain embodiments as illustrated in FIG. 2, the at least one optical bus comprises a distribution bus 115 and a return bus 116. The distribution bus 115 is configured in certain embodiments to be optically coupled to at least one source 110 and to a plurality of reflective sensing elements 200. The return bus 116 is configured in certain embodiments to be optically coupled to at least one optical detector 120 and to the plurality of reflective sensing elements 200.

Figure 3:
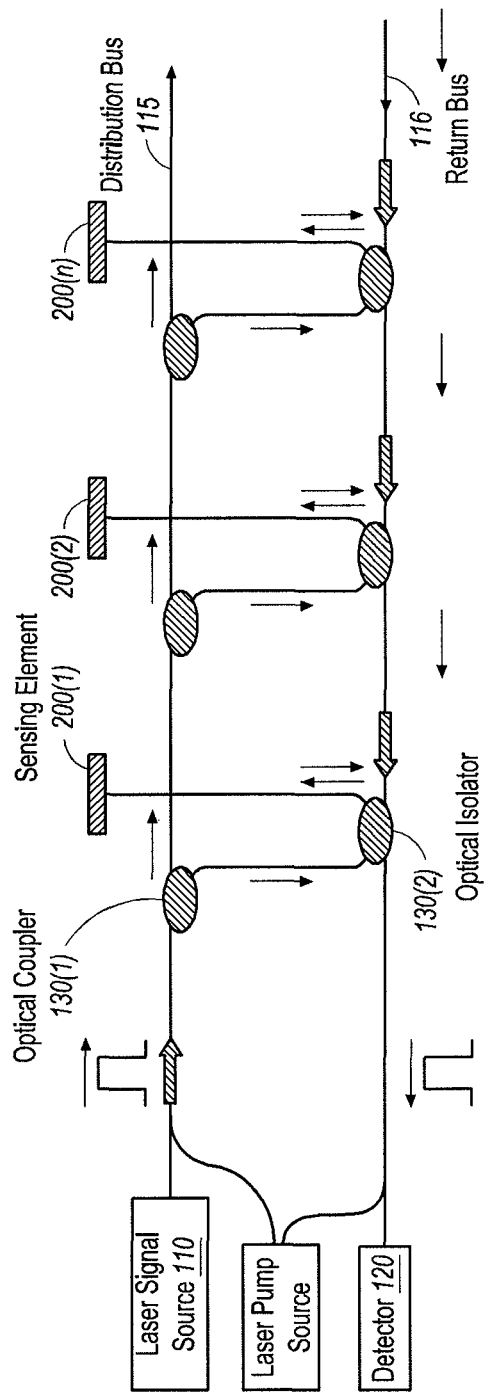
Figure 4:
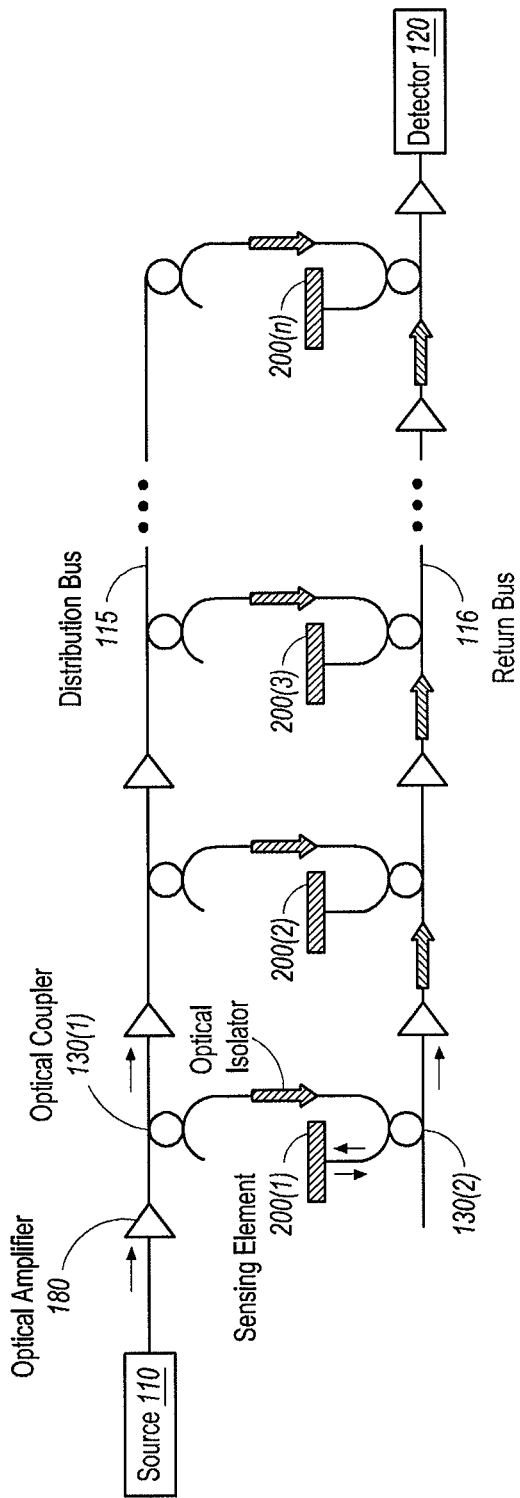

FIGS. 2-4 schematically illustrate examples of optical apparatus 10 utilizing sensors operating in the reflection mode in accordance with certain embodiments described herein. For example, FIG. 2 shows an example passive array (e.g., with no optical amplifiers) and FIG. 4 shows an example active array (e.g., with optical amplifiers). In these embodiments, the at least one optical bus comprises a plurality of optical couplers 130. In certain embodiments, at least one reflective sensing element 200(1) of the plurality of reflective sensing elements 200 is optically coupled to the distribution bus 115 by at least one optical coupler 130(1) of the plurality of optical couplers 130. The at least one reflective sensing element 200(1) of the plurality of reflective sensing elements 200 is also optically coupled to the return bus 116 by at least one optical coupler 130(2) of the plurality of optical couplers 130. In certain embodiments, the optical apparatus 10 can comprise a plurality of optical delay lines with each optical delay line positioned between sequential optical couplers along the distribution bus 115 (e.g., sequential optical couplers 130(1)) or positioned between sequential optical couplers along the return bus 116 (e.g., sequential optical couplers 130(2)). For example, FIG. 10B schematically illustrates an example apparatus 10 that comprises optical delay lines along the distribution bus 115. These optical delay lines can be configured to apply a delay to optical pulses propagating between the sequential optical couplers so as to prevent temporal overlapping of optical pulses (e.g., for time-division multiplexing).

In certain embodiments described herein, as shown in FIG. 2, the reflective sensing element 200(1) is optically coupled to the distribution bus 115 by an optical coupler 130(1). The reflective sensing element 200(1) is also optically coupled to the return bus 116 by two optical couplers 130(1) and 130(2). A portion of the input optical signal in the distribution bus 115 is directed by the optical coupler 130(1) to the reflective sensing element 200(1). The reflective sensing element 200 (1) reflects at least a portion of the received portion. The reflected portion of the received portion is directed by the optical coupler 130(1) to the return bus 116 via the optical coupler 130(2).

A portion of the input optical signal in the distribution bus 115 which does not get directed to the reflective sensing element 200(1) is directed by the optical coupler 130(1) to another optical coupler 130(1) and is used to provide an optical signal to the second reflective sensing element 200(2). In this way, portions of the input optical signal are provided to the sensing elements 200(1), 200(2), . . . 200(n). Similarly, the reflected signals from the sensing elements 200(1), 200(2), . . . 200(n) are directed by an optical coupler 130(1) to the return bus 116 via an optical coupler 130(2).

In certain embodiments, as shown in FIGS. 3 and 4, the reflective sensing element 200(1) is optically coupled to the return bus 116 by an optical coupler 130(2). It is also optically coupled to the distribution bus 115 by two optical couplers 130(1) and 130(2). In these embodiments, a portion of the input optical signal is directed by the two optical couplers 130(1) and 130(2) before being reflected from the reflective sensing element 200(1). After being modulated by the sensing element 200(1), at least a portion of the received portion is fed into the return bus by passing through a single optical coupler 130(2).

A portion of the input optical signal in the distribution bus 115 which does not get directed to the reflective sensing element 200(1) is directed by the optical coupler 130(1) to another optical coupler 130(1) and is used to provide an optical signal to the second reflective sensing element 200(2) via an optical coupler 130(2). In this manner, portions of the input optical signal are provided to the sensing elements 200(1), 200(2), . . . 200(n). Similarly, the reflected signals from the sensing elements 200(1), 200(2), . . . 200(n) are provided to the return bus 116 via an optical coupler 130(2).

In FIG. 3, the reflected signal from the sensing element 200(1) is distributed to the optical detector 120 by a single optical coupler 130(2), while the reflected signal from the sensing element 200(n) is distributed to the optical detector 120 by a plurality of optical couplers 130(2). In contrast, in FIG. 4, the reflected signal from the sensing element 200(1) is distributed to the optical detector 120 by a plurality of optical couplers 130(2), while the reflected signal from the sensing element 200(n) is distributed to the optical detector 120 by a single optical coupler 130(2).

Figure 5:
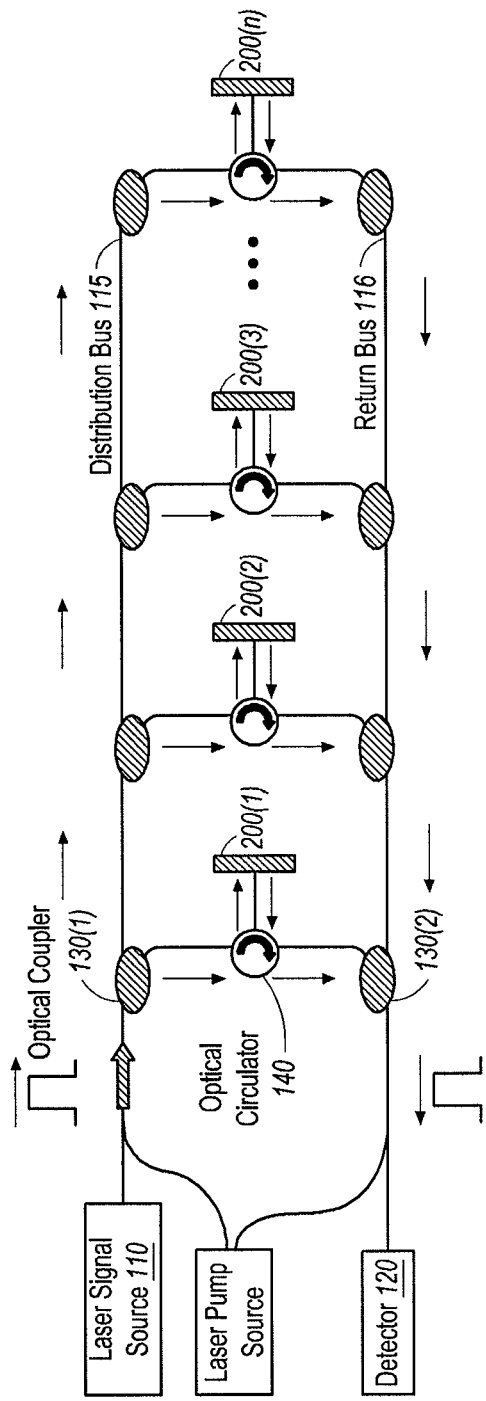
FIG. 5 schematically illustrates an example of an optical bus comprising at least one optical circulator in accordance with certain embodiments described herein.

FIG. 5 schematically illustrates another example of an apparatus utilizing sensors operating in the reflection mode in accordance with certain embodiments described herein. In FIG. 5, the optical bus comprises at least one optical circulator 140. The reflective sensing element 200(1) is optically coupled to the distribution bus 115 by the optical circulator 140 and the optical coupler 130(1), and is optically coupled to the return bus 116 by the optical circulator 140 and the optical coupler 130(2). In this embodiment, a portion of the input optical signal from the source 110 is directed by the optical coupler 130(1) to the reflective sensing element 200(1) via the optical circulator 140. The reflected portion is directed by the optical circulator 140 to the return bus 116 by the optical coupler 130(2).

A portion of the input optical signal in the distribution bus 115 which does not get directed to the reflective sensing element 200(1) is directed by the optical coupler 130(1) to another optical coupler 130(1) and is used to provide an optical signal to the reflective sensing element 200(2) via another optical circulator 140. Thus, portions of the input optical signal are provided to the sensing elements 200(1), 200(2), . . . 200(n). Similarly, the reflected signals from the sensing elements 200(1), 200(2), . . . 200(n) are directed by corresponding optical circulators 140 and are provided to the return bus 116 by corresponding optical couplers 130(2).

An advantage of this embodiment is the reduction of the number of times the signal passes through an optical coupler, therefore reducing the loss. The portion of the input optical signal from the source 110 that is directed to the reflective sensing element 200(1) passes through the optical coupler 130(1) once, and the reflected signal from the reflected sensing element 200(1) passes through the optical coupler 130(2) once. On the other hand, in FIG. 2, the portion of the input optical signal from the source 110 passes through the optical coupler 130(1) and the reflected signal from the reflected sensing element 200(1) also passes through the optical coupler 130(1). In FIG. 3, the portion of the input optical signal from the source 110 passes through the optical coupler 130(2) and the reflected signal from the reflected sensing element 200(1) also passes through the optical coupler 130(2).

However, persons skilled in the art will recognize that the optical circulator in certain embodiments, for example as in FIG. 5, can be replaced in certain embodiments by an optical coupler.

Figure 6:
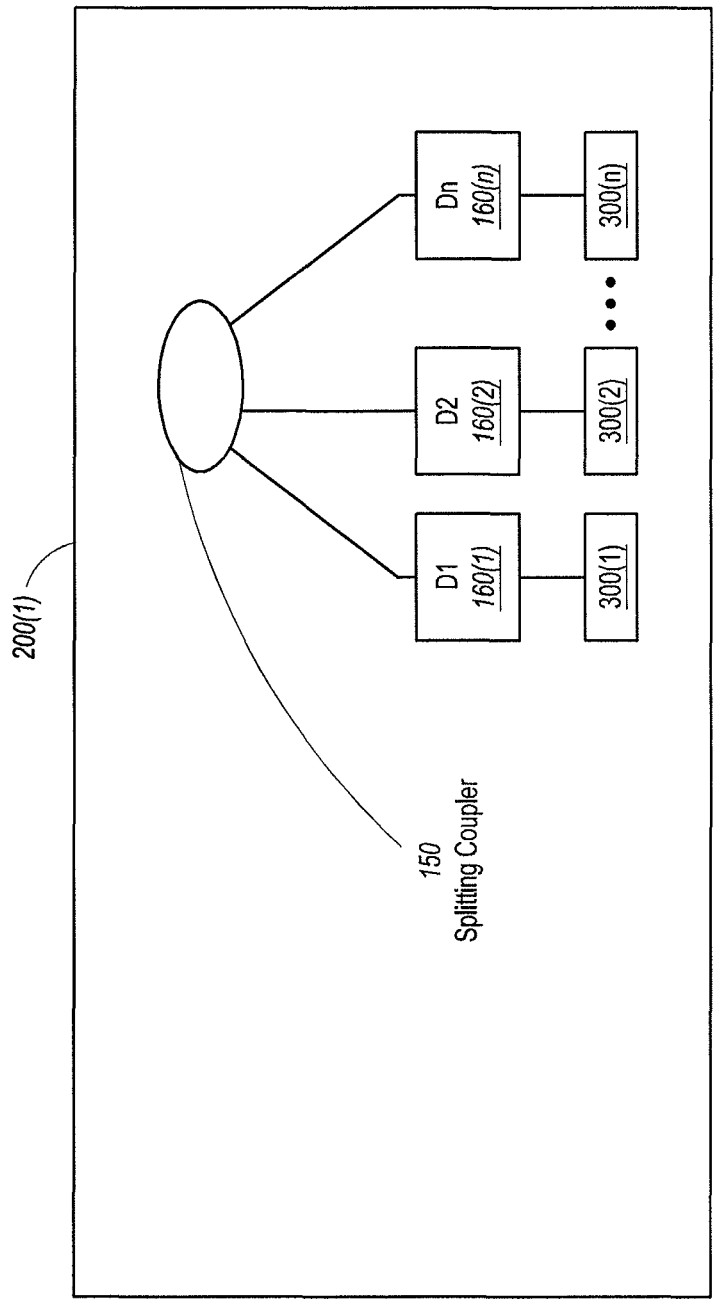
FIG. 6 schematically illustrates a reflective sensing element comprising a splitting coupler and a plurality of sensors in accordance with certain embodiments described herein.

As mentioned above and illustrated in FIG. 1B, the reflective sensing element 200(1) can contain at least one sensor 300(1). In certain other embodiments, for example as shown in FIG. 6, the reflective sensing element 200(1) comprises a splitting coupler 150 and a plurality of sensors 300 optically coupled to the splitting coupler 150. In certain other embodiments, also shown in FIG. 6, the at least one reflective sensing element 200(1) comprises a plurality of delay elements 160. The delay elements 160 are optically coupled to the splitting coupler 150 and to a corresponding sensor 300. For example, in FIG. 6, delay element 160(1) is optically coupled to the splitting coupler 150 and to corresponding sensor 300(1).

Figure 7:
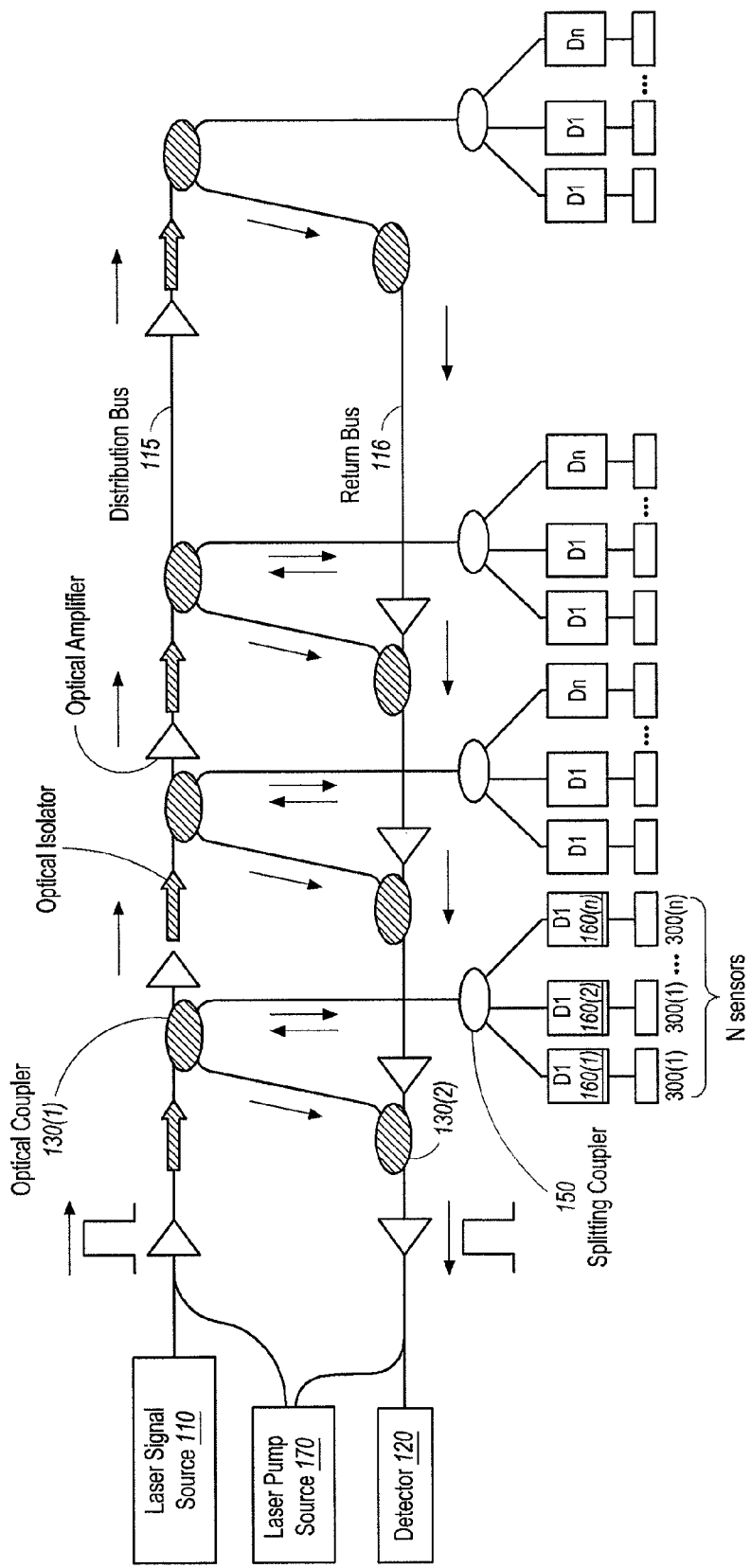
FIG. 7 schematically illustrates an example optical apparatus where a reflective sensing element comprises a splitting coupler, a plurality of sensors, and a plurality of delay elements in accordance with certain embodiments described herein.

In certain embodiments described herein, the splitting coupler 150 is a star coupler used to multiplex several sensors 300(1), 300(2), . . . 300(n). In certain embodiments, the delay elements 160(1), 160(2), . . . 160(n) may or may not be used depending on whether a time delay is desired between responses coming from different sensors so that the responses do not overlap. In these embodiments, the splitting coupler 150 can be a wavelength division multiplexer and the delay element 160 can be a length of waveguide. FIG. 6 shows that embodiments described herein with the sensing element as comprising a single sensor can be modified to incorporate a splitting coupler 150 and multiple sensors 300. FIG. 7 shows one such example embodiment.

In FIG. 7, the splitting coupler 150 and delay elements 160 are applied to the configuration shown in FIG. 2, such that the splitting coupler 150 is optically coupled to the distribution bus 115 by an optical coupler 130(1). The splitting coupler 150 is optically coupled to the delay elements 160(1), 160(2), . . . 160(n), which are optically coupled to sensors 300(1), 300(2), . . . 300(n) respectively. The sensors 300(1), 300(2), . . . 300(n) are optically coupled to the return bus 116 by the delay elements 160(1), 160(2), . . . 160(n), the splitting coupler 150, and the two optical couplers 130(1) and 130(2). A portion of the input optical signal in the distribution bus 115 is directed by the optical coupler 130(1) to the splitting coupler 150, which distributes portions of the signal to the sensors 300(1), 300(2), . . . 300(n) via the delay elements 160(1), 160(2), . . . 160(n). After being modulated by the sensors 300(1), 300(2), . . . 300(n), portions of the received portions are fed to the delay elements 160(1), 160(2), . . . 160(n). The delay elements 160(1), 160(2), . . . 160(n) introduce corresponding time delays to prevent the reflected portions from reaching the optical detector 120 at the same time. The reflected portions are directed by the splitting coupler 150 and the optical coupler 130(1) to the return bus 116 via the optical coupler 130(2).

A portion of the input optical signal in the distribution bus 115 which does not get directed to the splitting coupler 150 is directed by the optical coupler 130(1) to another optical coupler 130(1) and is used to provide an optical signal to the second splitting coupler 150, which is optically coupled to another group of delay elements 160(1), 160(2), . . . 160(n) and sensors 300(1), 300(2), . . . 300(n).

In accordance with certain embodiments described herein, for example as shown in FIGS. 2, 3, 5, 8, 9, and 10, the at least one optical bus can be optically coupled to a laser pump source 170. In certain embodiments, the laser pump source 170 may be one of a variety of laser pump sources well known in the art, although sources yet to be devised may be used as well.

Figure 8:
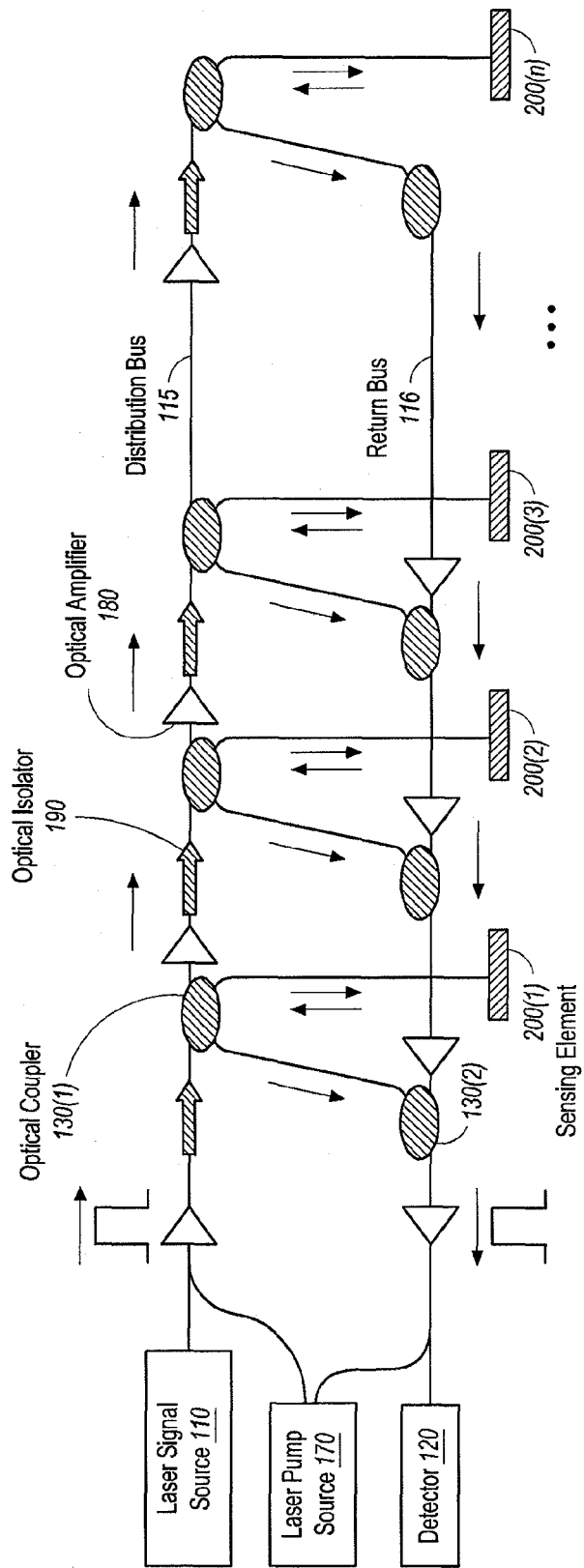
FIGS. 8, 9, 10A, and 10B schematically illustrate examples of an optical bus optically coupled to a laser pump source, optical amplifiers, optical isolators, or a combination thereof in accordance with certain embodiments described herein.
Figure 9:
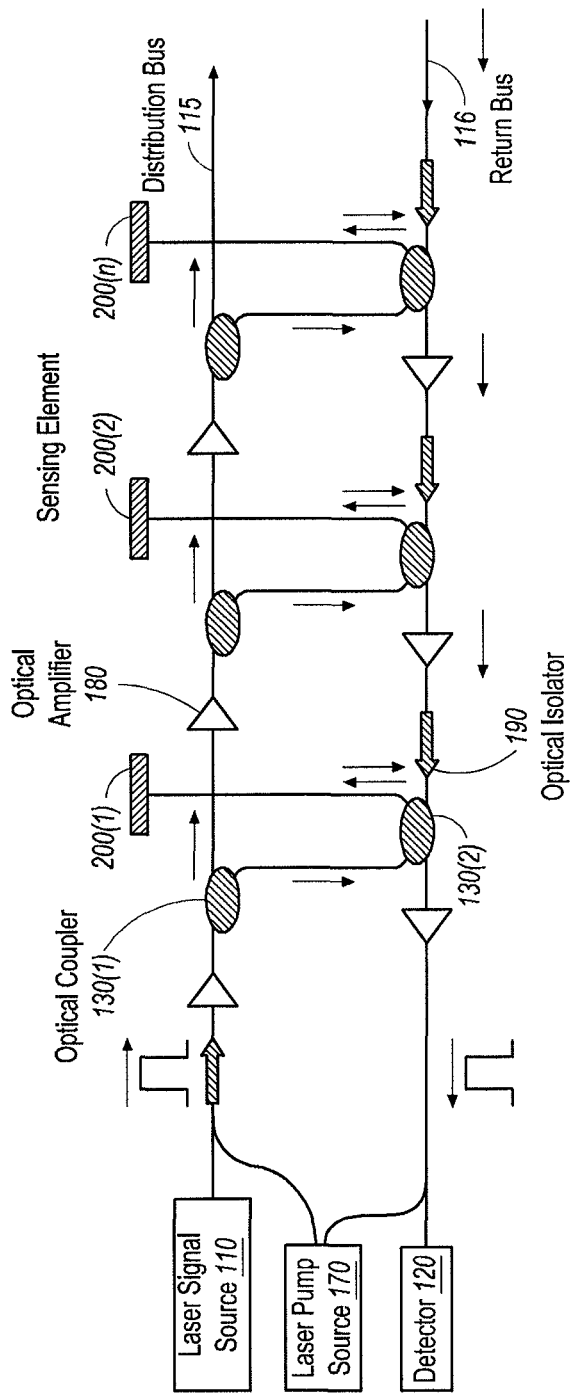

In accordance with certain embodiments described herein, for example as shown in FIGS. 8, 9, and 10, the at least one optical bus further comprises one or more optical amplifiers 180. For example, certain embodiments multiplexing a large number of sensors utilize optical amplifiers, e.g. erbium-doped fiber amplifiers (EDFAs). In these embodiments, optical amplifiers can be configured so that the return signals from the sensors exhibit a reasonable signal-to-noise ratio (SNR). The utilization of optical amplifiers can improve the noise figure performance substantially. In certain embodiments, one or more of the input signals, one or more of the reflected signals, or one or more of both the input and reflected signals are amplified by one or more amplifiers.

Certain embodiments also can utilize isolators to prevent lasing issues and instabilities, see, e.g., FIGS. 8, 9, and 10. Having a distribution bus and return bus allows the use of the isolators together with the optical amplifiers. The losses throughout the apparatus, e.g., splice losses, insertion losses for all the elements through the signal path, and the splitting losses, can be compensated by the optical amplifiers.

In accordance with certain embodiments described herein, FIG. 8 shows the configuration of FIG. 2 with a plurality of optical amplifiers 180 optically coupled to the distribution bus 115 and a plurality of optical amplifiers 180 optically coupled to the return bus 116. The input optical signal from the source 110 is amplified by an optical amplifier 180 before being directed by the optical coupler 130(1) to the reflective sensing element 200(1). The reflective sensing element 200(1) reflects at least a portion of the received portion. The reflected portion of the received portion is directed by the optical coupler 130(1) to the return bus 116 via the optical coupler 130(2), where the signal is amplified by at least one other optical amplifier 180 prior to being received by the optical detector 120.

A portion of the input optical signal in the distribution bus 115 which does not get directed to the reflective sensing element 200(1) is amplified by another optical amplifier 180 and another optical coupler 130(1) is used to provide the amplified portion of the optical signal to the second reflective sensing element 200(2). The reflected signal from sensing element 200(2) is amplified by another optical amplifier 180 after being directed by two optical couplers 130(1) and 130(2) to the return bus 116. This signal can be amplified again by one or more other optical amplifiers 180 while propagating through the return bus 116 to the optical detector 120. In this way, portions of the input optical signal are amplified prior to being received by the sensing elements 200(1), 200(2), . . . 200(n). Similarly, the reflected signals from the sensing elements 200(1), 200(2), . . . 200(n) are amplified prior to being received by the optical detector 120.

In accordance with certain embodiments described herein, FIG. 9 shows the configuration of FIG. 3 with a plurality of optical amplifiers 180 optically coupled to the distribution bus 115 and a plurality of optical amplifiers 180 optically coupled to the return bus 116. The input optical signal from the source 110 is amplified by an optical amplifier 180 before being directed by two optical couplers 130(1) and 130(2) to the reflective sensing element 200(1). The reflective sensing element 200(1) reflects at least a portion of the received portion. The reflected portion of the received portion is directed by the optical coupler 130(2) to the return bus 116, where the signal is amplified by at least one optical amplifier 180 prior to being received by the optical detector 120.

A portion of the input optical signal in the distribution bus 115 which does not get directed to the reflective sensing element 200(1) is amplified by another optical amplifier 180 and another two optical couplers 130(1) and 130(2) are used to provide the amplified portion of the optical signal to the second reflective sensing element 200(2). The reflected signal from sensing element 200(2) is amplified by another optical amplifier 180 after being directed by the optical coupler 130(2) to the return bus 116. This signal can be amplified again by one or more optical amplifiers 180 while propagating through the return bus 116 to the optical detector 120. In this manner, portions of the input optical signal are amplified prior to being received by the sensing elements 200(1), 200(2), . . . 200(n). Similarly, the reflected signals from the sensing elements 200(1), 200(2), . . . 200(n) are amplified prior to being received by the optical detector 120.

Figure 10A:
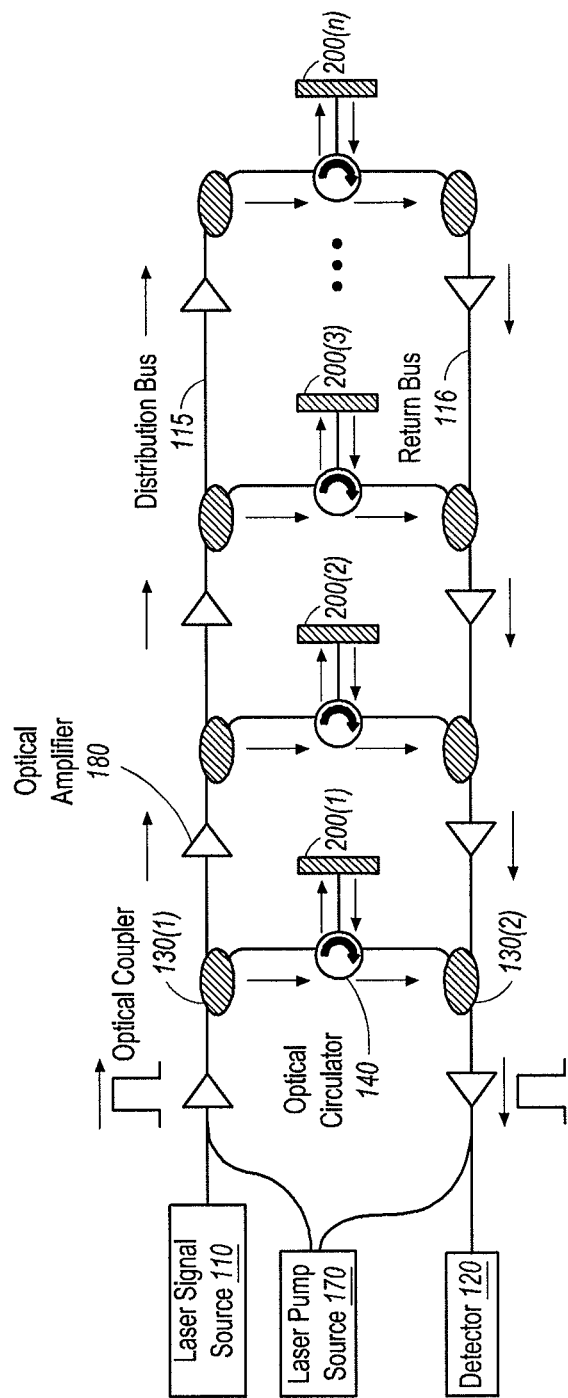
Figure 10B:
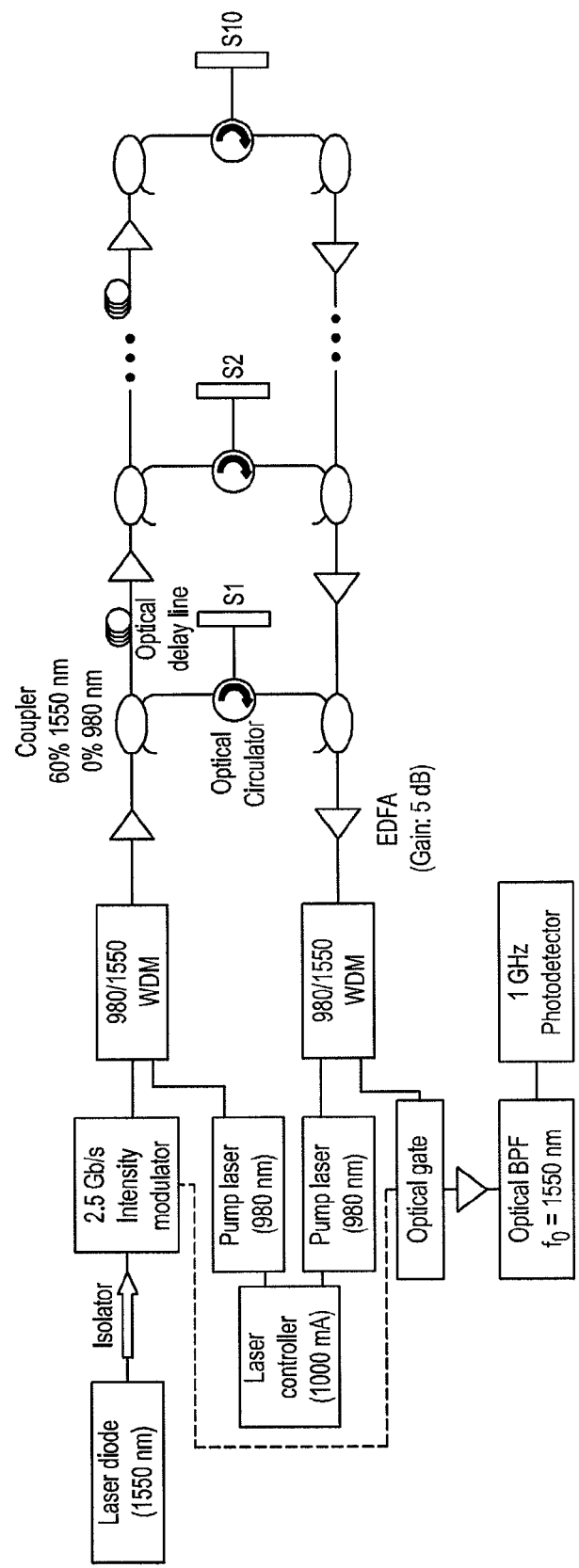

In accordance with certain embodiments described herein, FIG. 10A shows the configuration of FIG. 5 with a plurality of optical amplifiers 180 optically coupled to the distribution bus 115 and a plurality of optical amplifiers 180 optically coupled to the return bus 116. The input optical signal from the source 110 is amplified by an optical amplifier 180 before being directed by the optical coupler 130(1) and the optical circulator 140 to the reflective sensing element 200(1). The reflective sensing element 200(1) reflects at least a portion of the received portion. The reflected portion of the received portion is directed by the optical circulator 140 to the return bus 116 via the optical coupler 130(2), where the signal is amplified by at least one optical amplifier 180 prior to being received by the optical detector 120. FIG. 10B shows a particular example of the configuration of FIG. 10A with a laser signal source 110 comprising a laser diode (1550 nm), a laser pump source 170 comprising a pair of pump lasers (980 nm) coupled to the distribution bus 115 and the return bus 116 by corresponding wave-division-multiplexers, a detector 120 comprising a 1 GHz photodetector, optical couplers 130 comprising (60% 1550 nm; 0% 980 nm) couplers, and optical amplifiers 180 comprising EDFAs having a gain of 5 dB.

A portion of the input optical signal in the distribution bus 115 which does not get directed to the reflective sensing element 200(1) is amplified by another optical amplifier 180 and another optical coupler 130(1) and optical circulator 140 are used to provide the amplified portion of the optical signal to the second reflective sensing element 200(2). The reflected signal from the sensing element 200(2) is amplified by another optical amplifier 180 after it is directed by the optical circulator 140 and the optical coupler 130(2) to the return bus 116. This signal can be amplified again by one or more optical amplifiers 180 while it propagates through the return bus 116 to the optical detector 120. Thus, portions of the input optical signal are amplified prior to being received by the sensing elements 200(1), 200(2), ... 200(n). Similarly, the reflected signals from the sensing elements 200(1), 200(2), ... 200(n) are amplified prior to being received by the optical detector 120.

In addition, the coupling ratios of the optical couplers 130 optically coupled to the distribution bus 115 and to the return bus 116 may be the same or different from one another. They may be optimized to achieve the best noise figure performance or to maximize the returning signal power from the sensors. For example, referring to FIG. 2, the coupling ratios of the optical couplers 130 can be selected or tailored to improve the signal-to-noise equalization among the sensing elements 200.

FIGS. 11-17 illustrate other examples of optical apparatus utilizing sensors operating in the reflection mode in accordance with certain embodiments described herein. One or more of the amplifiers 180 can be positioned such that a portion of the input optical signal can be amplified prior to the portion of the input optical signal being received by the at least one sensing element 200 as seen, for example, in FIGS. 13 and 15. One or more of the amplifiers 180 can be positioned to amplify the reflected portion, as in FIGS. 11 and 16. One or more of the amplifiers 180 can be positioned to amplify both the portion of the input signal and the reflected portion, as in FIGS. 12, 14, and 17.

Figure 11:
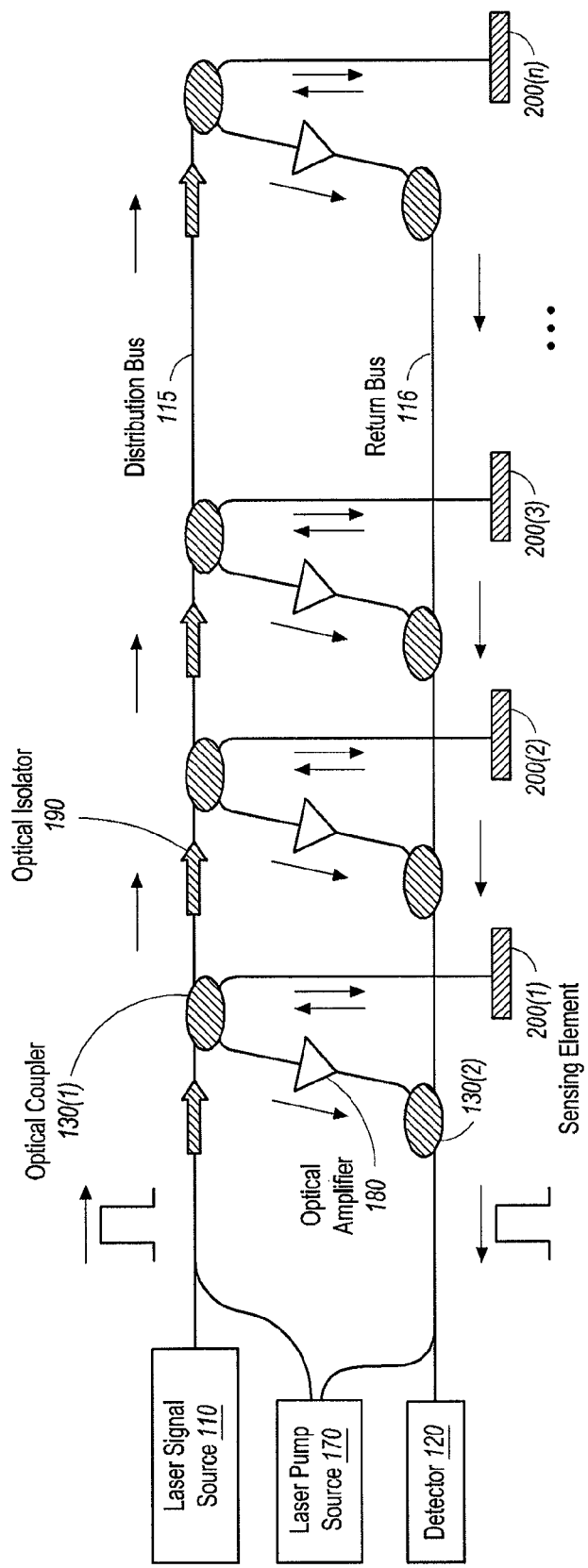
FIGS. 11-17 schematically illustrate various examples of optical apparatus utilizing sensors operating in the reflection mode in accordance with certain embodiments described herein.
Figure 12:
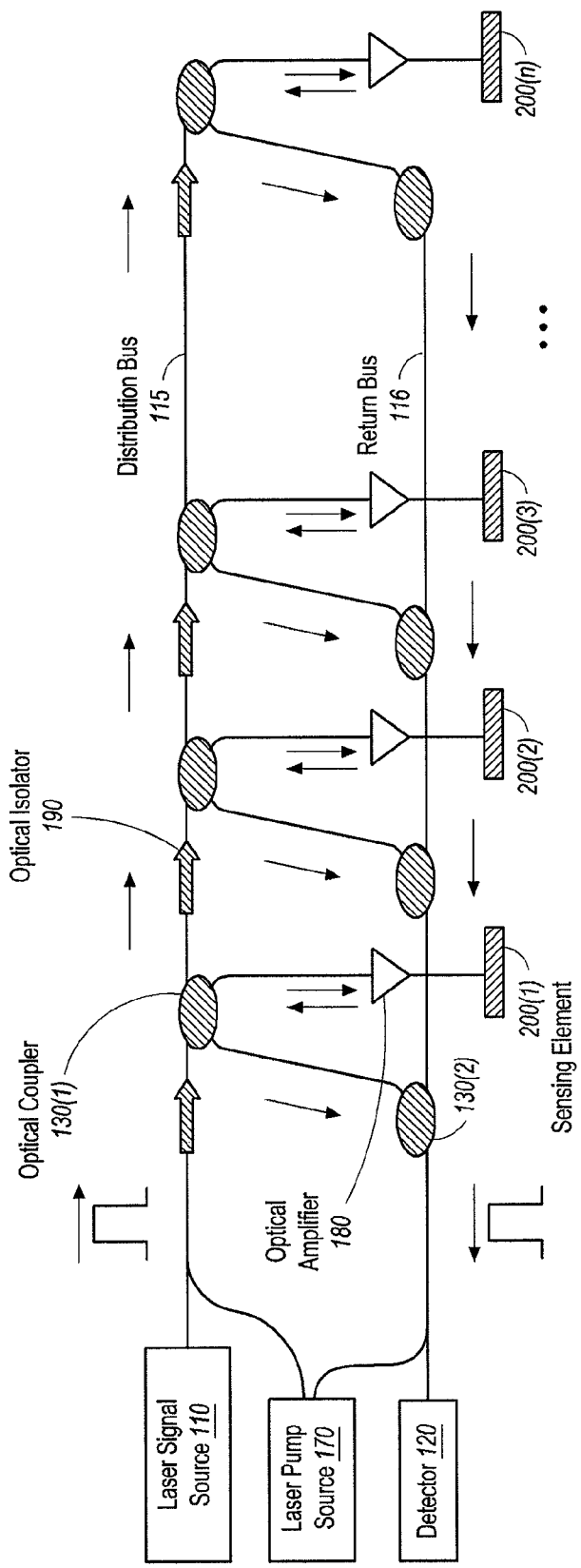

In accordance with certain embodiments described herein, FIG. 11 shows the configuration of FIG. 2 with the optical amplifiers 180 positioned such that the reflected signals from the reflective sensing elements 200 are amplified by the optical amplifiers 180 after being directed by the optical couplers 130(1) but prior to being directed by the optical couplers 130(2) to the return bus 116. The optical amplifiers 180 of FIG. 11 do not amplify the input signals propagating to the sensing elements 200. In contrast, FIG. 12 shows the configuration of FIG. 2 with the optical amplifiers 180 positioned such that portions of the input optical signal are amplified by the optical amplifiers 180 after being directed by the optical couplers 130(1) and the reflected portions from the sensing elements 200 are amplified by the optical amplifiers 180 prior to being directed by the optical couplers 130(1) and 130(2) to the return bus 116.

Figure 13:
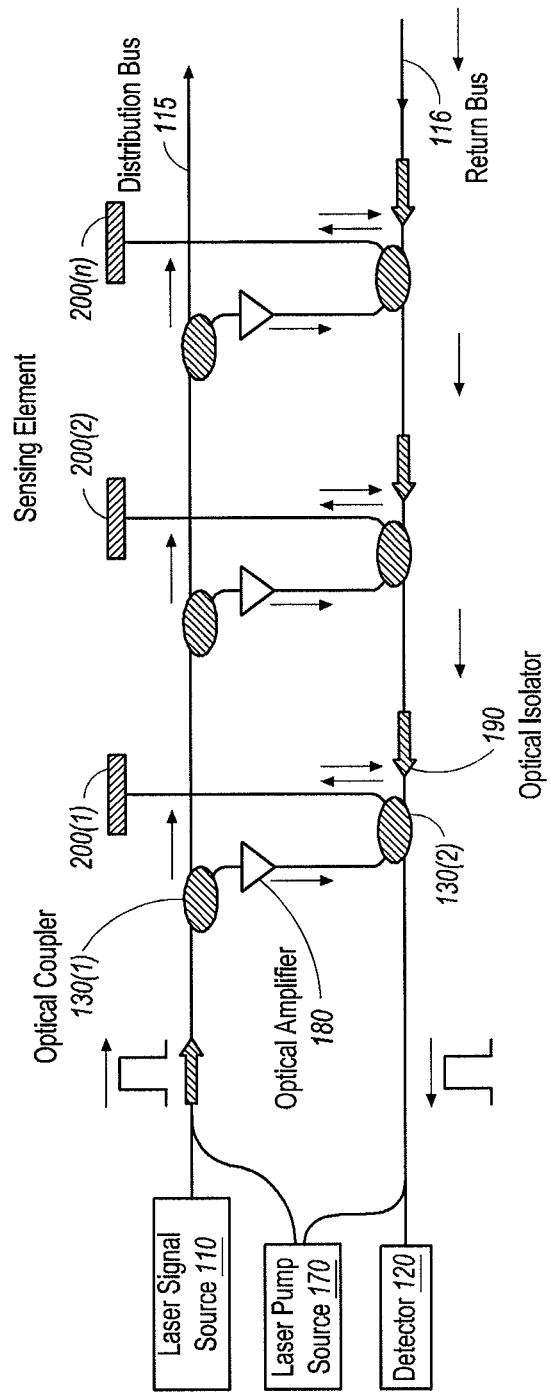
Figure 14:
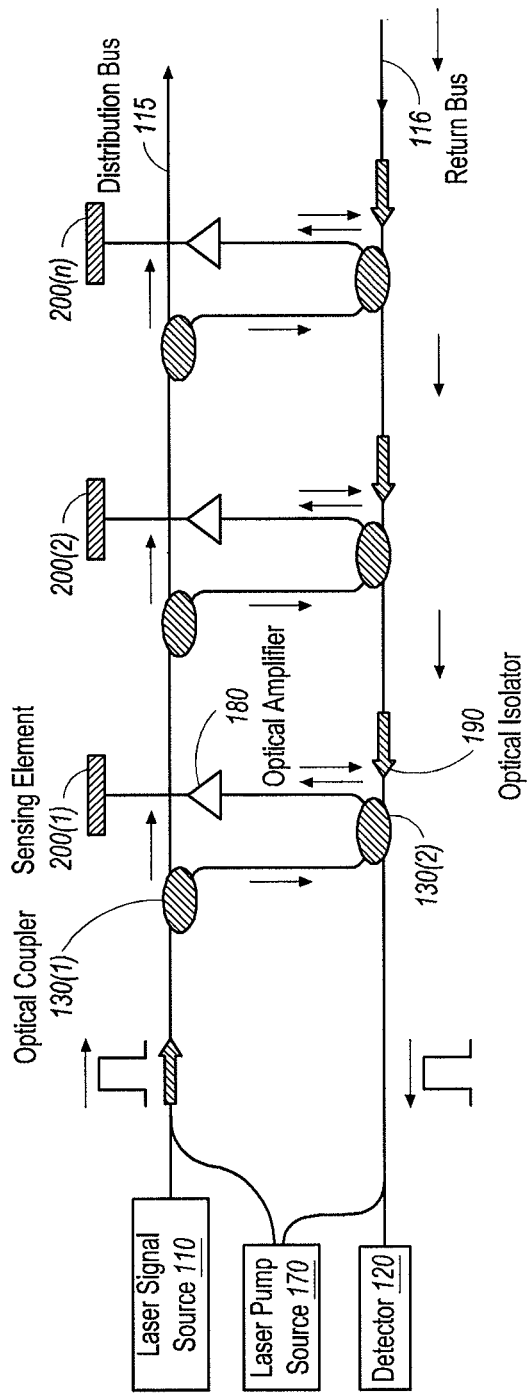

In accordance with certain embodiments described herein, FIG. 13 shows the configuration of FIG. 3 with the optical amplifiers 180 positioned such that portions of the input optical signal are amplified by the optical amplifiers 180 after being directed by the optical couplers 130(1) but before being directed by the optical couplers 130(2) to the reflective sensing elements 200. The optical amplifiers 180 of FIG. 13 do not amplify the reflected portions from the sensing elements 200. In contrast, FIG. 14 shows the configuration of FIG. 3 with the optical amplifiers 180 positioned such that portions of the input optical signal are amplified by the optical amplifiers 180 after being directed by the optical couplers 130(1) and 130(2) and the reflected portions from the sensing elements 200 are amplified by the optical amplifiers 180 prior to being directed by the optical couplers 130(2) to the return bus 116.

Figure 15:
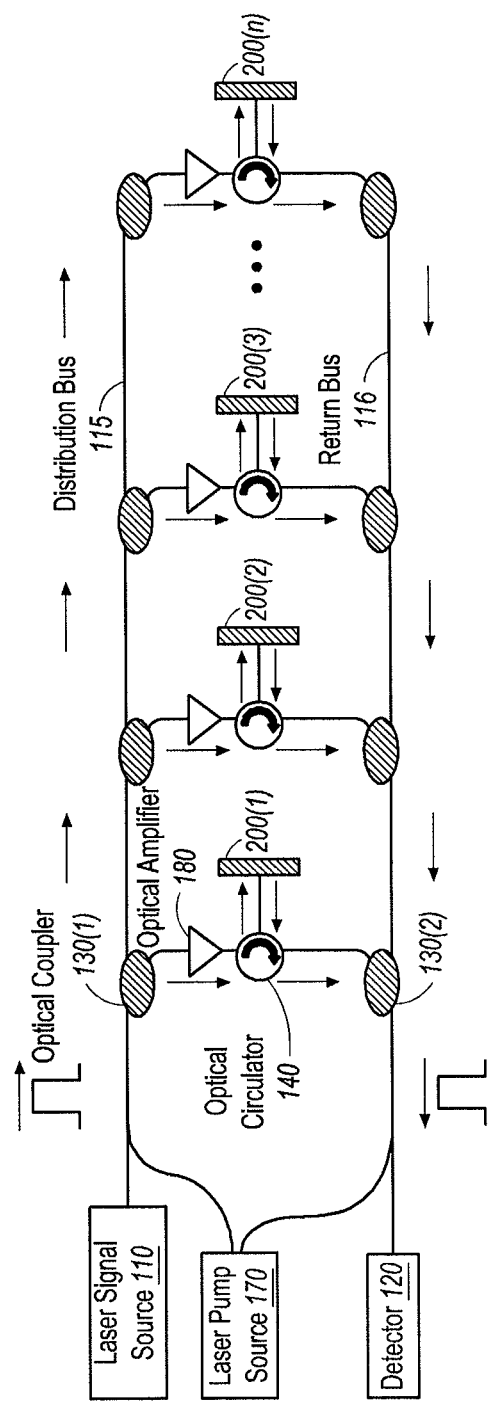
Figure 16:
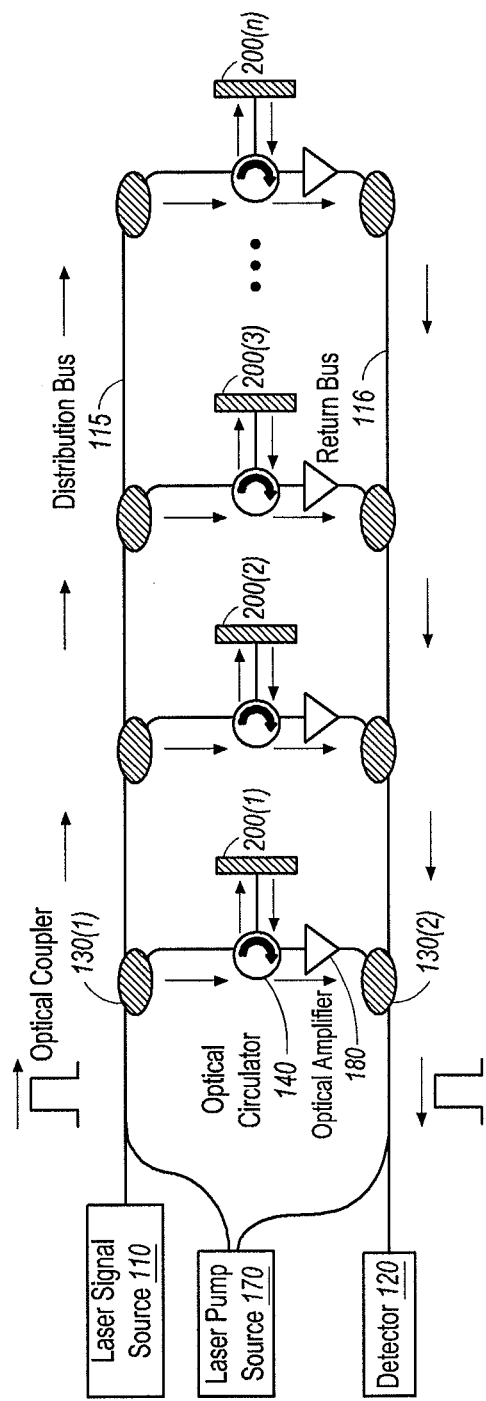

In accordance with certain embodiments described herein, FIG. 15 shows the configuration of FIG. 5 with the optical amplifiers 180 positioned such that portions of the input optical signal are amplified by the optical amplifiers 180 after being directed by the optical couplers 130(1) but before being directed by the optical circulators 140 to the reflective sensing elements 200. The optical amplifiers 180 of FIG. 15 do not amplify the reflected portions from the sensing elements 200. In accordance with certain embodiments described herein, FIG. 16 shows the configuration of FIG. 5 with the optical amplifiers 180 positioned such that the reflected signals are amplified by the optical amplifiers 180 after being directed by the optical circulators 140 but prior to being directed by the optical couplers 130(2) to the return bus 116. The optical amplifiers 180 of FIG. 16 do not amplify the input signals propagating to the sensing elements 200.

Figure 17:
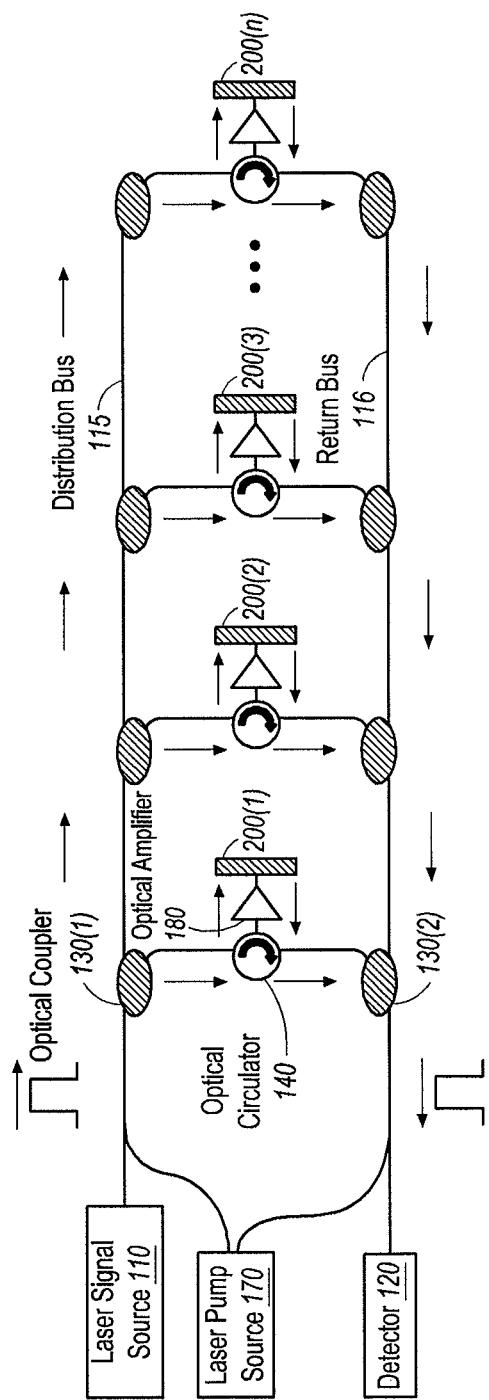

In accordance with certain embodiments described herein, FIG. 17 shows the configuration of FIG. 5 with the optical amplifiers 180 positioned such that portions of the input optical signal are amplified by the optical amplifiers 180 after being directed by the optical couplers 130(1) and the optical circulators 140 but still prior to being received by the reflective sensing elements 200 and the reflected portions from the sensing elements 200 are also amplified by the optical amplifiers 180 prior to being directed by the optical circulators 140 and the optical couplers 130(2) to the return bus 116.

In certain embodiments, an apparatus may multiplex more than one sensor per amplifier. An example can be seen in FIG. 7 where at least one reflective sensing element 200 comprises a splitting coupler 150 and a plurality of sensors 300 as previously described. Thus, in certain embodiments, amplifiers need not be incorporated prior to or after every sensor 300. The location and gain of each amplifier 180 may be selected depending on the desired application and specifications. For example, while the configuration of FIG. 7 includes an optical amplifier 180 between each pair of successive optical couplers 130 along the distribution bus 115 and between each pair of successive optical couplers 130 along the return bus 116, certain embodiments do not have an optical amplifier 180 between each successive pair of optical couplers 130 along the distribution bus 115 or the return bus 116. Certain such embodiments include an optical amplifier 180 only between selected optical couplers 130 (e.g., between every other pair of optical couplers 130, or only between the optical couplers 130 of one of the distribution bus 115 and return bus 116).

FIG. 4 shows a configuration in which the signal-to-noise ratios for the various sensing elements 200 can be substantially equal to one another. In the configuration of FIG. 4, the light propagates through the system such that the total amount of amplification for signals corresponding to each sensing element 200 are substantially equal to one another. In certain embodiments described herein, see for example FIG. 4, a first portion of the input optical signal is amplified by a first factor (e.g., by virtue of propagating through one amplifier 180 of the distribution bus 115). The first portion of the input optical signal is received by the sensing element 200(1). The respective reflected portion from the sensing element 200(1) is amplified by a second factor prior to being received by the optical detector 120 (e.g., by virtue of propagating through a plurality of amplifiers 180 of the return bus 116). A portion of the input optical signal that does not get directed to the sensing element 200(1) is amplified by a third factor prior to being received by the sensing element 200(2) (e.g., by virtue of propagating through two amplifiers 180 of the distribution bus 115). The respective reflected portion from the sensing element 200(2) is amplified by a fourth factor prior to being received by the optical detector 120 (e.g., by virtue of propagating through one fewer amplifiers 180 of the return bus 116). The apparatus can be configured such that the sum of the first factor and the second factor substantially equals the sum of the third factor and the fourth factor. In certain such embodiments, a signal-to-noise ratio for the reflected signal from sensing element 200(1) is substantially equal to the signal-to-noise ratio for the reflected signal from sensing element 200(2).

As an example, in the embodiment depicted in FIG. 4, if each optical amplifier 180 amplifies by the same percentage of gain (e.g., by a gain g), the first factor would be g because the input optical signal is amplified by one optical amplifier 180 of the distribution bus 115 prior to being received by the reflective sensing element 200(1). The second factor would be (n×g) because the reflected signal from the sensing element 200(1) is amplified by n optical amplifiers 180 of the return bus 116 prior to being received by the optical detector 120. The third factor would be (2×g) because the portion of the input optical signal is amplified by two optical amplifiers 180 of the distribution bus 115 prior to being received by the reflective sensing element 200(2). The fourth factor would be [(n−1)×g] because the reflected signal from sensing element 200(2) is amplified by (n−1) optical amplifiers 180 of the return bus 116 prior to being received by the optical detector 120. In this embodiment, the sum of the first factor and the second factor [g+(n×g)=(n+1)×g] equals the sum of the third factor and the fourth factor [(2×g)+(n−1)×g=(n+1)×g]. In certain embodiments in which there are losses in each rung (e.g., between and including the corresponding optical couplers 130(1) and 130(2) on each side of a sensing element 200), each optical amplifier 180 can be configured such that the gain from the optical amplifier 180 equals the loss in the corresponding rung and there would not be a net gain at the output.

In certain embodiments having active arrays (an example of which is schematically illustrated by FIG. 4), the optical couplers 130 on the distribution bus 115 and return bus 116 can couple a portion of the power at the signal wavelength (e.g., coupling ratio optimized for signal-to-noise for a given input power budget). In certain embodiments, the optical couplers 130 can couple zero percentage at the pump wavelength, and substantially all the power at the pump wavelength can be transmitted to minimize the pump power budget.

Persons skilled in the art would recognize that the percentage of gain for each optical amplifier 180 does not have to be the same for all optical amplifiers 180 and that the number of optical amplifiers 180 for each reflective sensing element 200 does not have to be the same for the sum of the first factor and the second factor to substantially equal the sum of the third factor and the fourth factor. Persons skilled in the art can select the appropriate number of amplifiers and percentages of gain of the amplifiers to achieve this result in view of the disclosure provided herein.

Figure 18:
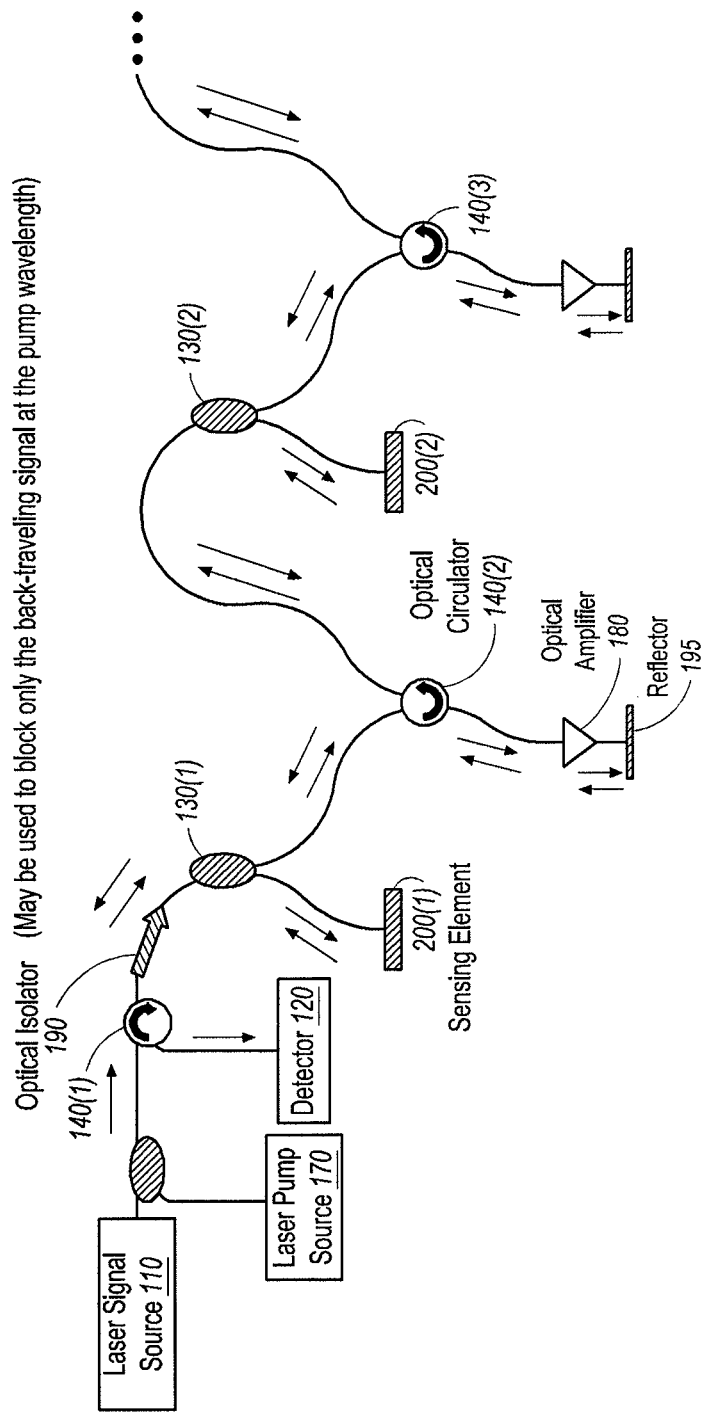
FIG. 18 schematically illustrates an example of an optical apparatus utilizing a single optical bus in accordance with certain embodiments described herein.

FIG. 18 schematically illustrates an example of an apparatus utilizing a single optical bus in accordance with certain embodiments described herein. Certain such embodiments have an advantage of utilizing only one fiber for both distributing the input optical signal and transmitting the returning reflected optical signals. These embodiments can be configured to include at least one optical source 110 and at least one optical detector 120 at the front end of the optical bus; as schematically illustrated by FIG. 18.

In certain embodiments, e.g. FIG. 18, the pump from the laser pump source 170 and the unmodulated signal from the laser signal source 110 travel through the apparatus. They are directed by the optical circulator 140(1) and the optical coupler 130(1) to the reflective sensing element 200(1). The reflected signal from the sensing element 200(1) is directed by the optical coupler 130(1) and the optical circulator 140(1) to the optical detector 120. A portion of the input optical signal which does not get directed to the reflective sensing element 200(1) is directed by the optical circulator 140(2) to the optical amplifier 180 and the reflector 195. The reflector 195 reflects at least a portion of the signal back through the optical amplifier 180 and is directed by the optical circulator 140(2) to the optical coupler 130(2), which directs the signal to the sensing element 200(2). The reflected portion from the sensing element 200(2) is directed by the optical coupler 130(2) back to the optical circulator 140(2). The optical circulator 140(2) directs the reflected signal back to the optical coupler 130(1). The optical coupler 130(1) directs the reflected signal to the optical detector 120 via the optical circulator 140(1).

In this manner, portions of the input optical signal are directed by the optical circulators 140 and the optical couplers 130 to the reflective sensing elements 200(1), 200(2), . . . 200(n). The optical circulators 140 and the optical couplers 130 also direct the portions of the unmodulated input optical signal to the optical amplifiers 180 and reflectors 195. Signals pass through the optical amplifiers 180 and are then reflected by the reflectors 195 which cause the signals to pass through the optical amplifiers 180 again. Because the signals pass through the optical amplifiers twice, this embodiment can reduce the size (e.g., length) of the optical amplifiers 180 used to achieve a given gain. The unmodulated signals reflected from the reflectors 195 are fed towards the remaining part of the apparatus as interrogating signals that probes the remaining sensing elements 200 in the apparatus. On the other hand, in this embodiment, the reflected portions from the sensing elements 200 can be directed only towards the front end (e.g., the end at which the input signals are introduced into the system), where the optical detector 120 and any other receiving electronics reside.

It is possible to replace the optical circulator 140(1) used to couple the response signal coming from the apparatus to the optical detector 120 at the front end, by a combination of an optical isolator and an optical coupler. Persons skilled at the art would recognize the cost of an additional loss resulting from the splitting loss of the coupler. Furthermore, it is possible to utilize optical isolators in the portions of the system including sensing elements to prevent the signal at the pump wavelength from reaching the sensing element.

Persons skilled in the art would recognize that certain embodiments of the apparatus can be modified so that at least a portion of the reflected portion from a sensing element can be reflected by a reflector so that the portion of the reflected portion passes through an amplifier twice.

In certain embodiments, an optical filter is positioned on the optical bus such that the reflected portion passes through the filter prior to being received by an optical detector. The filter can filter out white noise.

Figure 19:
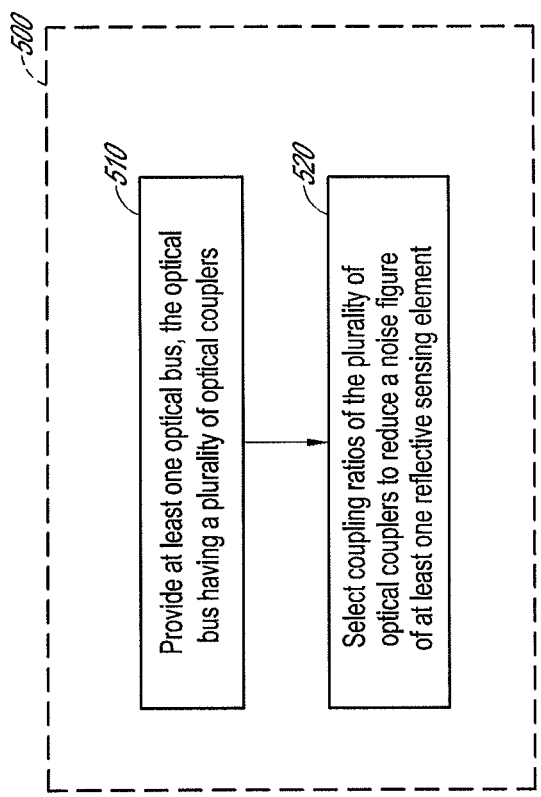
FIG. 19 is a flowchart of an example embodiment of a method for configuring an optical bus to be optically coupled to a plurality of reflective sensing elements.

FIG. 19 is a flowchart of an example method 500 for configuring an optical bus to be optically coupled to a plurality of reflective sensing elements in accordance with certain embodiments described herein. The method 500 comprises providing at least one optical bus 100, as shown in the operational block 510 of FIG. 19. The optical bus 100 comprises a plurality of optical couplers 130. The at least one optical bus 100 is configured to be optically coupled to at least one source 110 of input optical signals, to at least one optical detector 120, and to a plurality of reflective sensing elements 200 by the plurality of optical couplers 130. The at least one optical bus 100 transmits an input optical signal from the at least one source 110 to the plurality of reflective sensing elements 200 such that at least one reflective sensing element 200(1) of the plurality of reflective sensing elements 200 receives a portion of the input optical signal and reflects at least a portion of the received portion. The at least one optical bus 100 transmits the reflected portion to the at least one optical detector 120. The method 500 also comprises selecting coupling ratios of the plurality of optical couplers 130 to reduce a noise figure of the at least one reflective sensing element 200(1), as shown in the operational block 520 of FIG. 19.

Figure 20:
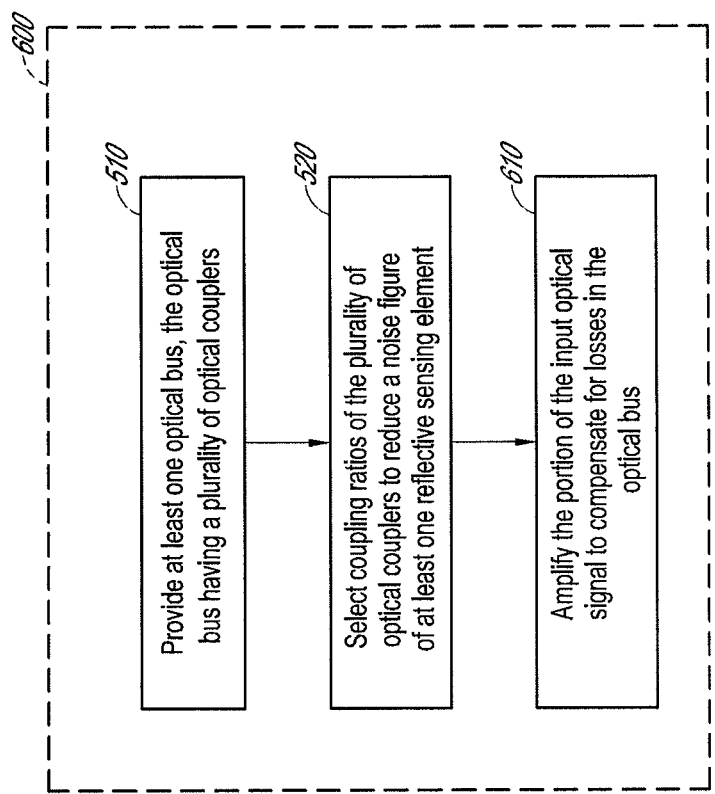
FIGS. 20-25 are flowcharts of other example embodiments of methods for configuring an optical bus to be optically coupled to a plurality of reflective sensing elements.

FIG. 20 is a flowchart of another example embodiment of a method 600 for configuring an optical bus to be optically coupled to a plurality of reflective sensing elements in accordance with certain embodiments described herein. The method 600 comprises the operational blocks 510 and 520, as described herein. The method 600 further comprises amplifying the portion of the input optical signal to compensate for losses in the at least one optical bus 100, as shown in operational block 610.

Figure 21:
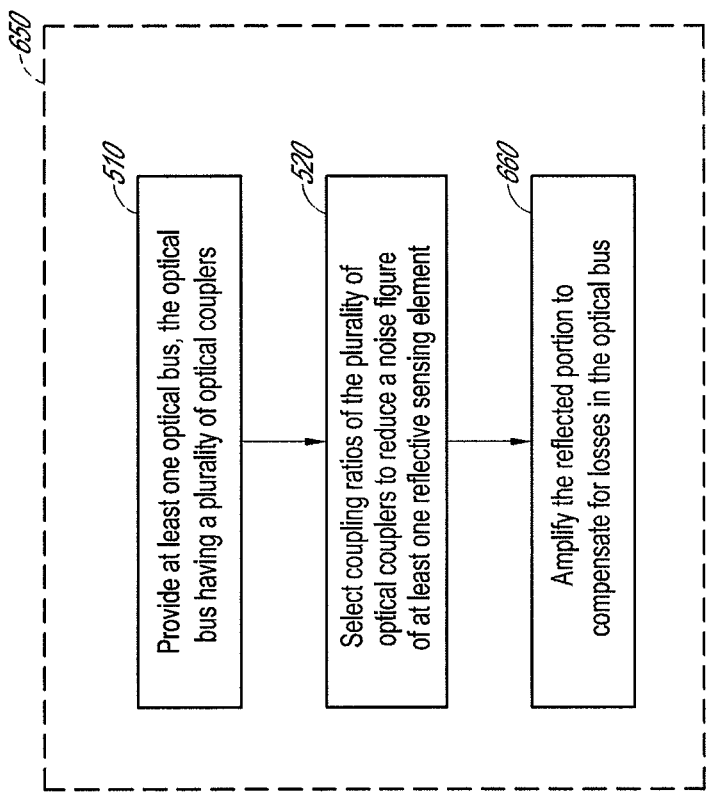

FIG. 21 is a flowchart of another example embodiment of a method 650 for configuring an optical bus to be optically coupled to a plurality of reflective sensing elements in accordance with certain embodiments described herein. The method 650 comprises the operational blocks 510 and 520, as described herein. The method 650 further comprises amplifying the reflected portion to compensate for losses in the at least one optical bus 100, as shown in operational block 660.

Figure 22:
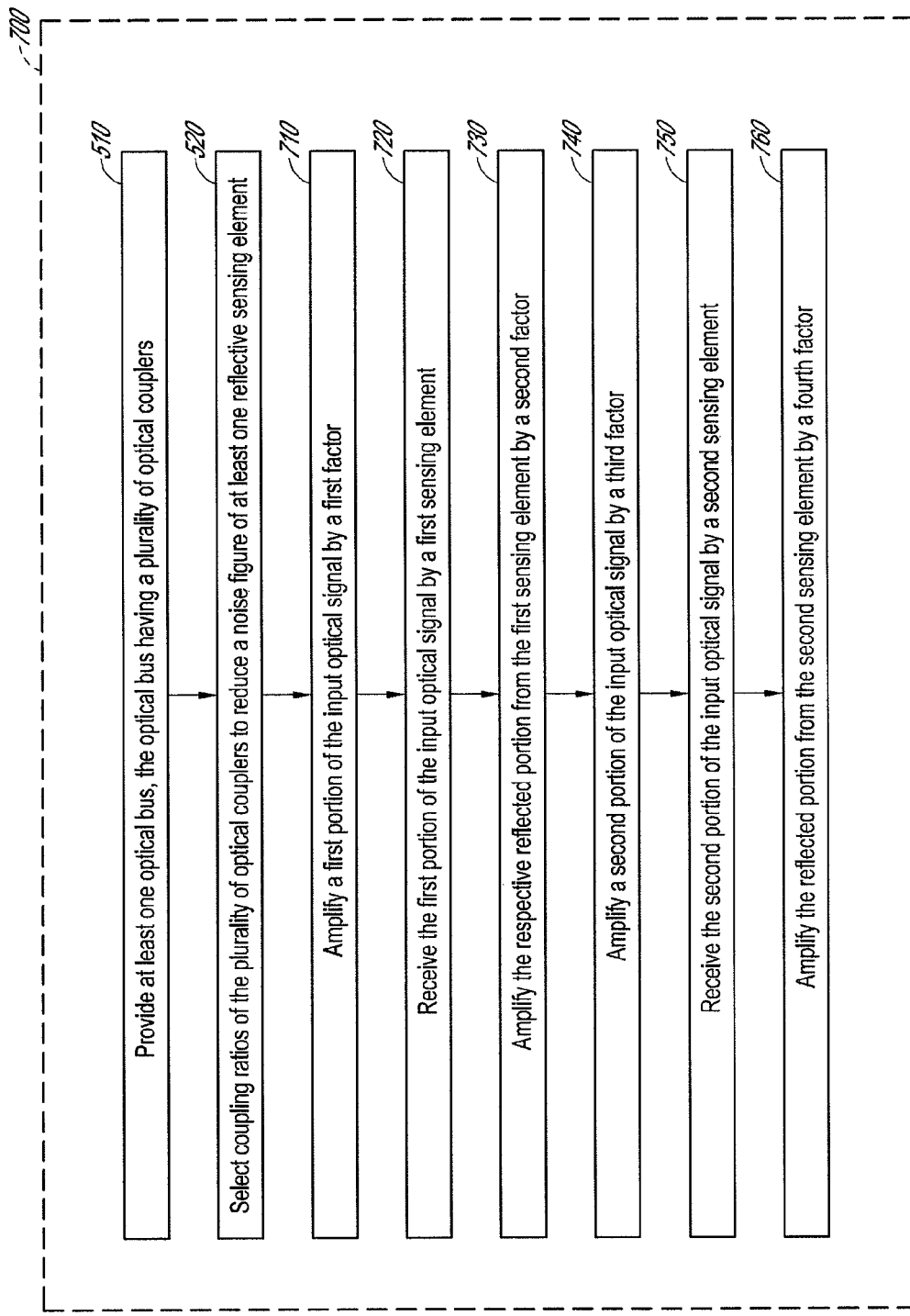

Another example embodiment of a method 700 for configuring an optical bus to be optically coupled to a plurality of reflective sensing elements in accordance with certain embodiments described herein is shown in the flowchart of FIG. 22. The method 700 comprises the operational blocks 510 and 520, as described herein. The method 700 further comprises amplifying a first portion of the input optical signal by a first factor in the operational block 710, receiving the first portion of the input optical signal by a first sensing element 200(1) in the operational block 720, amplifying the respective reflected portion from the first sensing element 200(1) by a second factor in the operational block 730, amplifying a second portion of the input optical signal by a third factor in the operational block 740, receiving the second portion of the input optical signal by a second sensing element 200(2) in the operational block 750, and amplifying the reflected portion from the second sensing element 200(2) by a fourth factor in the operational block 760. The sum of the first factor and the second factor substantially equals the sum of the third factor and the fourth factor.

Figure 23:
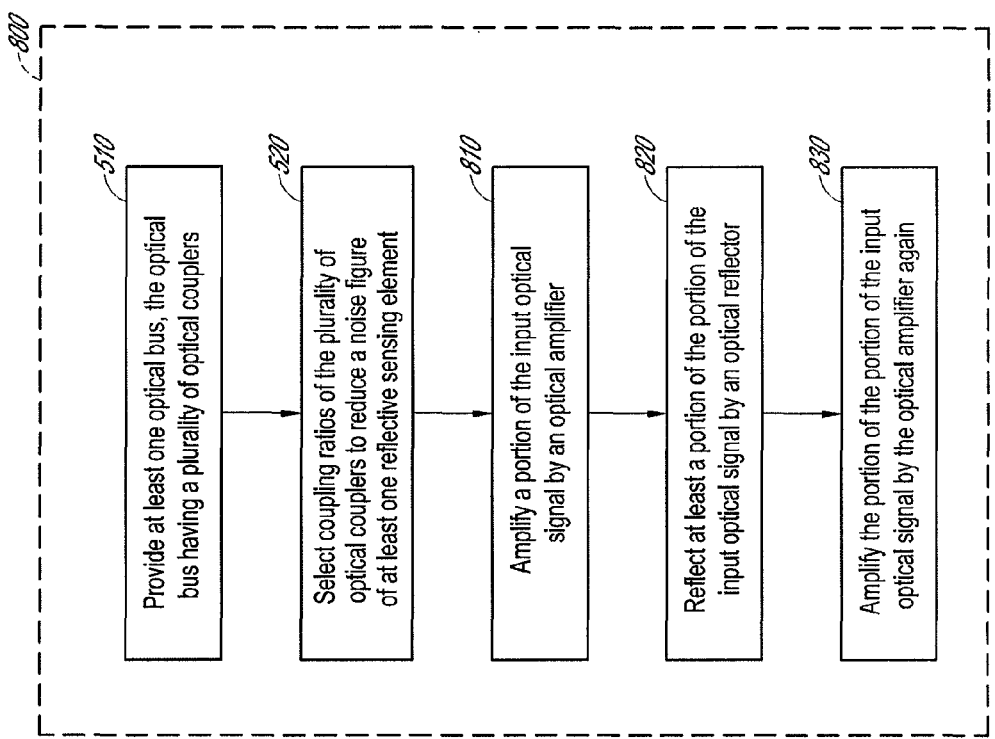

FIG. 23 is a flowchart of another example embodiment of a method 800 for configuring an optical bus to be optically coupled to a plurality of reflective sensing elements in accordance with certain embodiments described herein. The method 800 comprises the operational blocks 510 and 520, as described herein. The method 800 further comprises amplifying the portion of the input optical signal by an optical amplifier 180 in operational block 810, reflecting at least a portion of the portion of the input optical signal by an optical reflector 195 in operational block 820, and amplifying the portion of the portion of the input optical signal, which was reflected by the optical reflector 195, by the optical amplifier 180 again in operational block 830.

Figure 24:
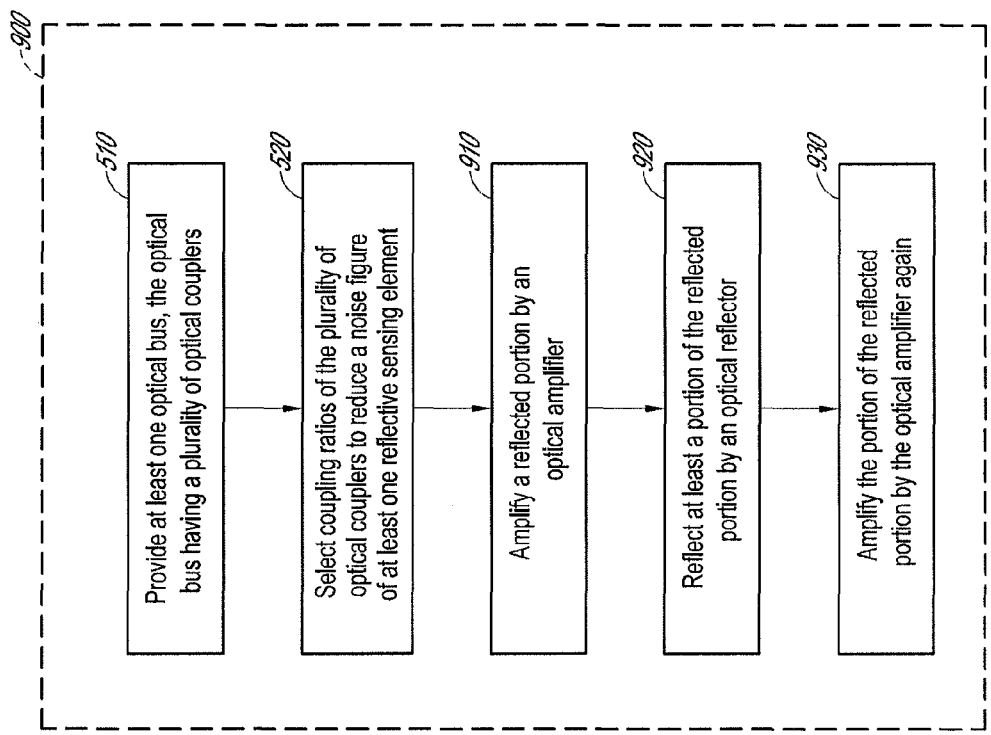

In certain embodiments, a method 900 for configuring an optical bus to be optically coupled to a plurality of reflective sensing elements is shown in the flowchart of FIG. 24. The method 900 comprises the operational blocks 510 and 520, as described herein. The method 900 further comprises amplifying the reflected portion by an optical amplifier 180 in operational block 910, reflecting at least a portion of the reflected portion by an optical reflector 195 in operational block 920, and amplifying the portion of the reflected portion by the optical amplifier 180 again in operational block 930.

Figure 25:
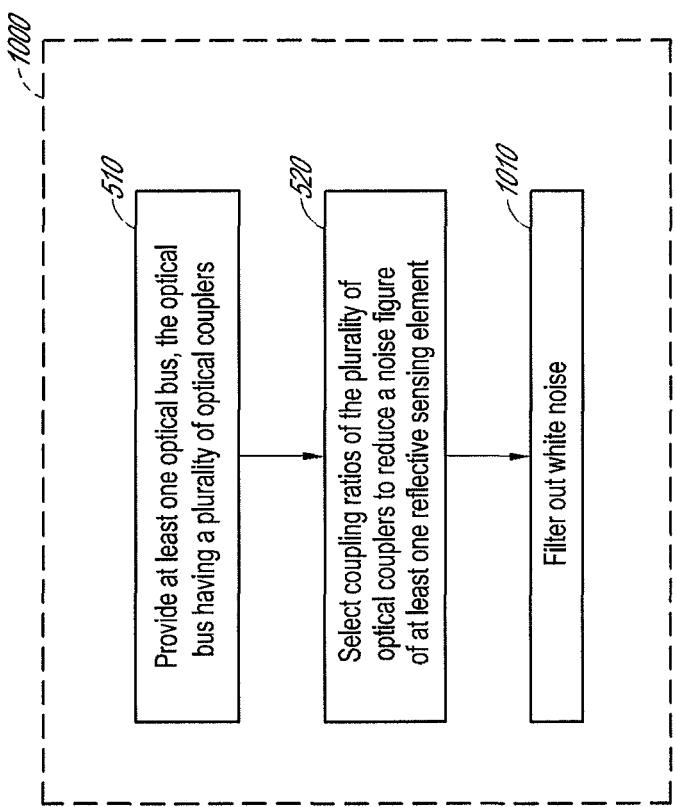

FIG. 25 is a flowchart of another embodiment of a method 1000 for configuring an optical bus to be optically coupled to a plurality of reflective sensing elements in accordance with certain embodiments described herein. The method 1000 comprises the operational blocks 510 and 520, as described herein. The method 1000 further comprises filtering out white noise, as shown in operational block 1010.

EXAMPLE

Figure 26B:
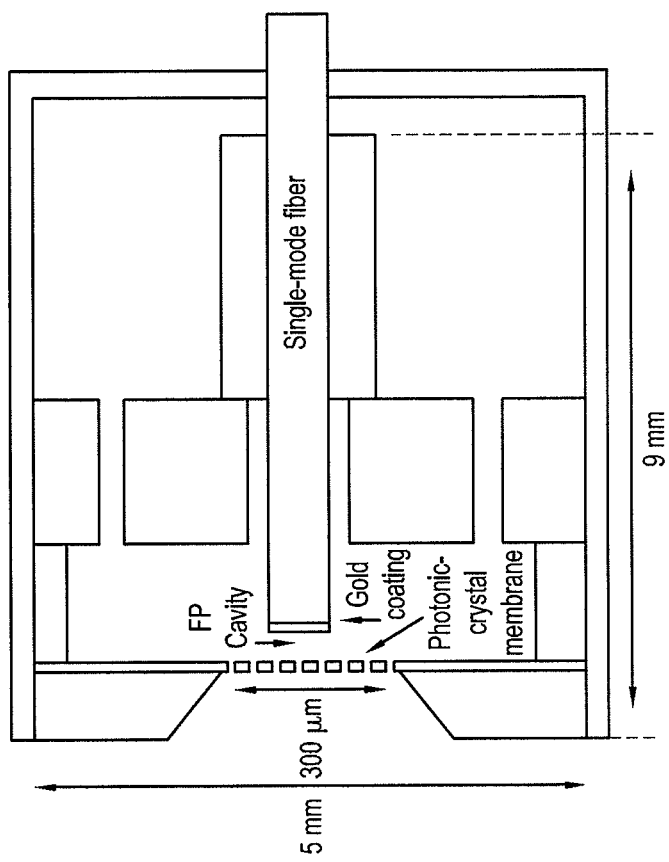
FIG. 26 shows a scanning electron microscope image of a photonic-crystal membrane and a schematic view of a Fabry-Perot (FP) interferometric sensor utilizing such a photonic-crystal membrane.
Figure 26A:
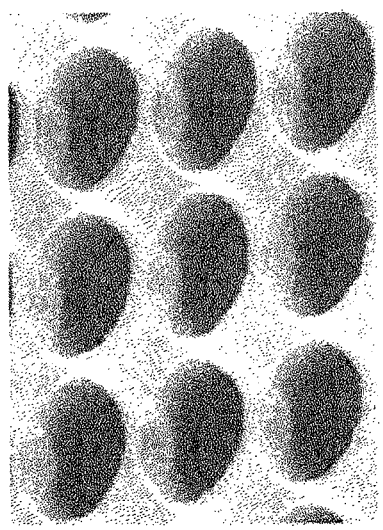

FIG. 10B schematically illustrates an example apparatus 10 in accordance with certain embodiments described herein, which utilizes time-division multiplexing (TDM). The distribution bus 115 and the return bus 116 are coupled to one another by a series of rungs (e.g., between optical coupler 130(1) and optical coupler 130(2)), each of which comprises one sensing element 200. FIG. 26 shows a scanning electron microscope image of a photonic-crystal membrane and schematically illustrates a Fabry-Perot (FP) interferometric sensor utilizing the photonic-crystal membrane and that can be used as the sensing element 200 for the example apparatus 10 of FIG. 10B. The FP sensor comprises a first reflector (e.g., 450-nm-thick single-crystal silicon photonic-crystal diaphragm that is a broadband reflector around 1.55 microns) configured to deflect in response to an acoustic wave incident on the sensor and a second reflector (e.g., a cleaved tip of a single-mode SMF-28 fiber) placed about 25 microns from the first reflector. Such sensing elements 200 are described in O. C. Akkaya et al., "Modeling and Demonstration of Thermally Stable high-Sensitivity Reproducible Acoustic Sensors," J. of Microelectromechanical Systems, vo. 21, no. 6, 2012. The light signal source 110 comprises a low-noise 1550-nm laser diode with a 15-kHz linewidth, followed by an optical isolator and a 2.5-Gb/s $LiNbO_3$ intensity modulator creating 200-ns pulses with a repetition rate of 80 kHz (e.g., a duty cycle of 1.6%).

When a pulse is launched into the distribution fiber 115, it encounters the coupler 130(1) at the first rung, which couples a small portion of the pulse energy to the first sensing element 200(1) located in this rung via an optical circulator 140. At the sensing element 200(1), the pulse is amplitude modulated by the acoustic pressure incident on the sensing element 200(1). The amplitude-modulated pulse reflected by the sensing element 200(1) is directed by the same circulator 140(1) towards the bottom of the rung, where a second coupler 130(2) couples it on the return fiber 116. On the distribution fiber 115, the portion of the input pulse that is transmitted by the first coupler 130(1) travels to the second rung, where a fraction of its energy is coupled into the second rung, where it probes the second sensing element 200(2). The process goes on until the input pulse reaches the end of the array and all sensing elements 200 have been interrogated. For a given input pulse, the array therefore generates a series of N return pulses, each of which has probed a particular sensing element 200. When the first input pulse reaches the end of the array and returns back to the detector 120, a second input pulse can be launched into the array, so that the sensing elements 200 are interrogated (e.g., as frequently as possible). The returning pulses are detected at the front end with a single photodetector 120 placed at the end of the return fiber 116.

The couplers 130(1) and 130(2) were nominally identical with a coupling ratio of 60% at the signal wavelength. The optical circulators enable delivery of the pulses only in one direction, preventing recoupling of the pulses reflected from the sensing elements 200 back into the distribution fiber 115, thereby avoiding using additional optical isolators, and reducing the cost and complexity of the apparatus 10. Optical delay lines (e.g., fiber coils of length 100 meters) can be positioned between each rung to avoid temporal overlap between returning pulses with a delay between adjacent returning pulses of 480 ns.

The example apparatus 10 of FIG. 10B was designed to have equal optical power launched into each sensing element 200 and to have similar output signal-to-noise ratio (SNR) for the responses of all the sensing elements 200. In a passive array, unavoidable losses can result in attenuation of the pulses as they travel through the example apparatus 10. For example, splitting losses at the couplers 130 (~4 dB), insertion loss of the couplers 130 (~0.5 dB), and splice losses (~0.01 dB/splice) yield a total loss of ~5 dB/rung, which can deteriorate the output SNR substantially when a large number of sensing elements 200 are multiplexed. In a ten-sensor passive array, this loss implies that the launched signal would be ~50 dB lower at the tenth sensor than at the first sensor. This significant attenuation can limit the number of sensing elements 200 that can be multiplexed in such a TDM system.

To compensate for these losses, multiple low-gain optical amplifiers 180 (e.g., EDFAs) can be used, located along both the distribution fiber 115 and the return fiber 116 prior to each fiber coupler 130(1) and 130(2), as shown in FIG. 10B for example. These amplifiers 180 can be remotely pumped with the laser pump source 170 and can enable all-optical amplification of the pulses as they travel through the example apparatus 10. To conserve pump power, the couplers 130 can be WDM couplers that exhibit negligible coupling at the pump wavelength (e.g., 980 nm) so that they do not divert pump power away from the distribution fiber 115 or the return fiber 116. The amplifiers 180 can be operated under strong pump saturation, so that the pump power unabsorbed by one amplifier 180 continues down the fiber and pumps the downstream amplifiers 180.

For equal power in the pulses returning from all the rungs, or equivalently near-unity transmission at the signal wavelength along each fiber, the gain of each amplifier 180 is set to equal the loss. For example, the gain can satisfy the following equation:

$$G = \frac{1}{(1-C)\Gamma_{Er}^2 \Gamma_\delta} \quad (1)$$

where $\Gamma_{Er}$ is the loss of a splice between a single-mode fiber and an Er-doped fiber (EDF), $\Gamma_\delta$ is the excess power loss in the couplers 130, and C is the coupling ratio at the signal wavelength. A gain of about 5 dB per amplifier 180 can be achieved using a ~45-cm length of commercial EDF. The amplifiers 180 can be pumped with two 980-nm laser diodes located at the front end (e.g., two ~450-mW laser diodes, each driven by a 1-A current source), and the pump power can be selected to make sure that the last amplifier 180 receives enough power (e.g., ~100 mW) so that it is also pump saturated, such that the dependence of the gain on pump power variations is minimized.

The higher the coupling ratio at the signal wavelength, the higher the signal launched into each sensing element 200 and the higher the SNR for all the sensing elements 200. However, a higher coupling ratio also increases the splitting loss and the higher gain used for each amplifier to counter such loss can cause a higher noise generated by each amplifier and a higher pump power budget. For the ten-sensor example apparatus of FIG. 10B, the increase in the noise with increased gain was negligible. Therefore, the pump power was an important constraint in determining the optimum coupling ratio. The coupling ratio of 60% was selected because it was the maximum value for a pump power of 450 mW on each fiber.

Figure 27:
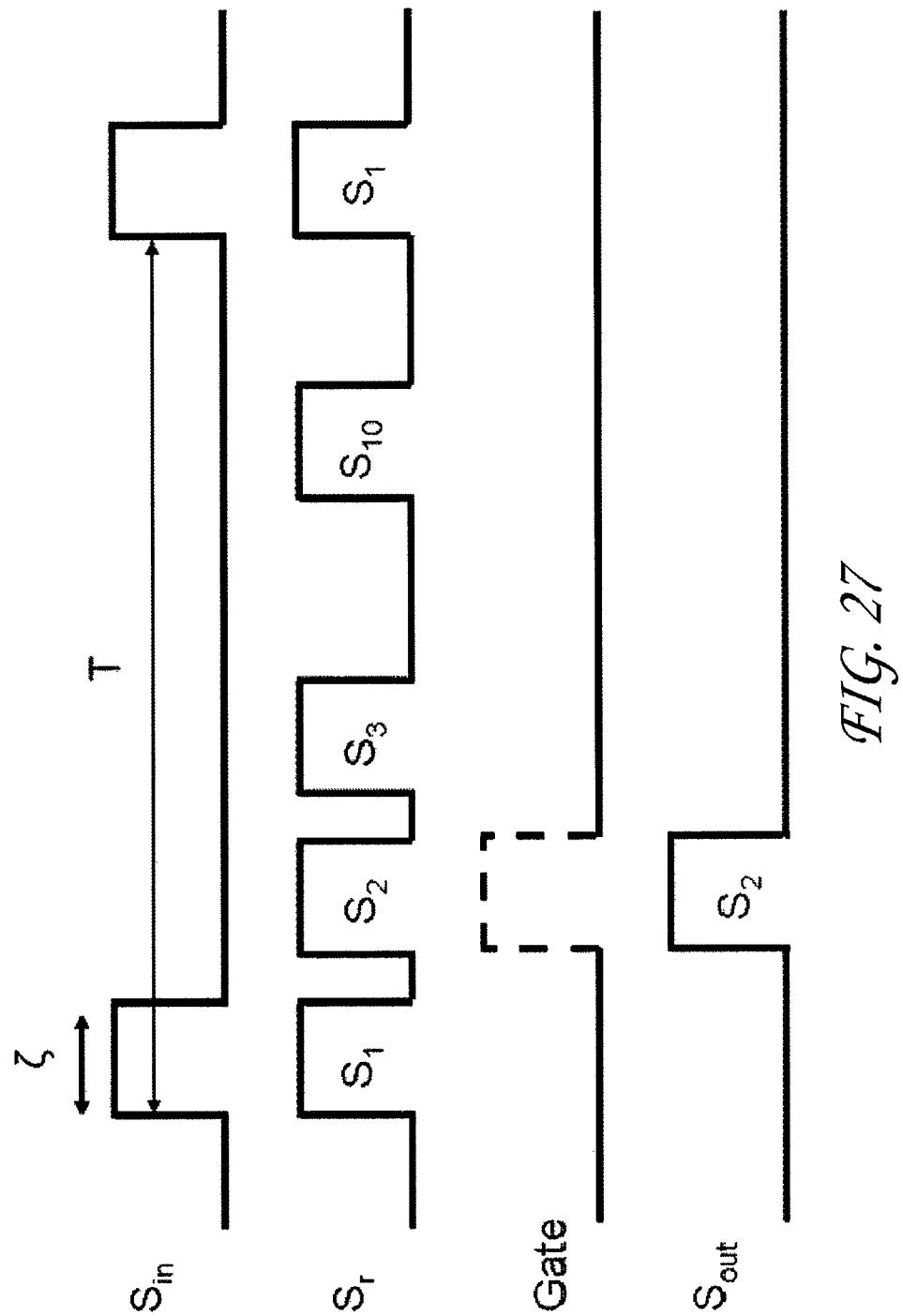
FIG. 27 schematically illustrates the time-domain operation of the example apparatus of FIG. 10B.

The time-domain operation of this example apparatus 10 is illustrated in FIG. 27. $S_{in}(t)$ represents the signal power input to the apparatus 10, and $S_r$ is the signal power in each of the pulses returning to the receiver (r=1, 2, . . . , 10). At the receiving end, the optical gate picks out the pulse from one specific sensing element 200, which can be chosen by appropriate setting of the RF delay generator which is triggered by the RF pulse generator that drives the intensity modulator at the input. Thus, the optical gate generates a train of ~220-*ns* pulses at an 80-kHz repetition rate with a variable delay. Selection and analysis of the response of each individual sensor in $S_r$, one sensor at a time, can be performed by varying the delay, such as the pulse returning from $S_3$ shown in FIG. 27. The optical gate is followed by an EDFA module to pre-amplify the pulse and compensate for the insertion loss of the gate. This EDFA is followed by an optical band-pass filter (BPF) with a ~1-nm bandwidth. This filter rejects the portion of amplified spontaneous emission (ASE) generated by the EDFAs that falls outside of the signal bandwidth, which substantially improves the pulse SNR. The output of the BPF is detected by a 1-GHz InGaAs PIN photodiode. The photodiode signal is amplified by a voltage amplifier with a voltage gain of 24 dB and a noise figure of 2.9 dB. The voltage amplifier output is fed into a dynamic signal analyzer (DSA) to analyze the signal.

The example apparatus 10 of FIG. 10B was assembled one rung at a time. Before assembling the next rung, the array output was monitored to make sure that there were no oscillations due to multipath interference or spurious reflections. The noise in the signal pulses returning from the last installed rung and the pump power passing through the rung was also measured to monitor the performance of the example apparatus 10.

Acoustic characterization of the individual sensing elements 200 was performed by launching ~0.1 mW of average optical signal power into the example apparatus 10. While all ten sensing elements 200 were connected to the example apparatus 10, the sensing element 200 to be characterized was placed in an acoustically isolated enclosure with antireflection walls. This enclosure minimized environmental noise, which would otherwise affect the low-frequency measurements in particular. An acoustic source located inside the chamber was operated at a fixed frequency. The enclosure's antireflection walls reduced acoustic resonances due to reflections from the walls and avoided the formation of standing waves, yielding close to uniform acoustic pressure inside the chamber. By adjusting the delay on the RF generator, the output pulse of the particular sensing element 200 under test was selected, and the SNR of the response of this sensing element 200 was analyzed with the DSA.

The input pulse train, $S_{in}(t)$, is a periodic succession of square pulses with a temporal power distribution Rect(t/DT) of width ζ, repetition period T, and duty cycle D=ζ/T. It can be mathematically described as a convolution in the time domain of an infinite periodic chain of Dirac functions, Λ, and of a rectangular pulse:

$$S_{in}(t) = 1/T\{\text{Rect}[t/(D \cdot T)] * \Lambda(t/T)\} \cdot \text{Rect}(t/z) \quad (2)$$

where z is the duration of the measurement window. By taking the Fourier transform of Eq. 2, the frequency domain representation of this pulse train can be calculated to be:

$$Z_{in}(f) = DTz[\text{sinc}(DTf) \cdot \Lambda(Tf)] * \text{sinc}(zf) \quad (3)$$

which is a train of Dirac delta functions with an envelope modulated by sinc(DTf). Amplitude modulation applied to the pulses on such a pulse train introduces sidebands in the signal's frequency spectrum $Z_{in}(f)$. These sidebands were used to demodulate the output signal and recover the acoustic signal from the output pulse sequence. The calibration was performed by measuring the actual incident acoustic pressure via a calibrated reference microphone placed inside the enclosure about 1 cm away from the sensing element 200 under test. The SNR of the sensing element response was characterized by comparing the amplitude of the sideband relative to the noise floor at the frequency of the acoustic signal. The minimum-detectable-pressure (MDP), in μPa/√Hz, was obtained by dividing the acoustic pressure (measured with the reference microphone) by the SNR.

Figure 28:
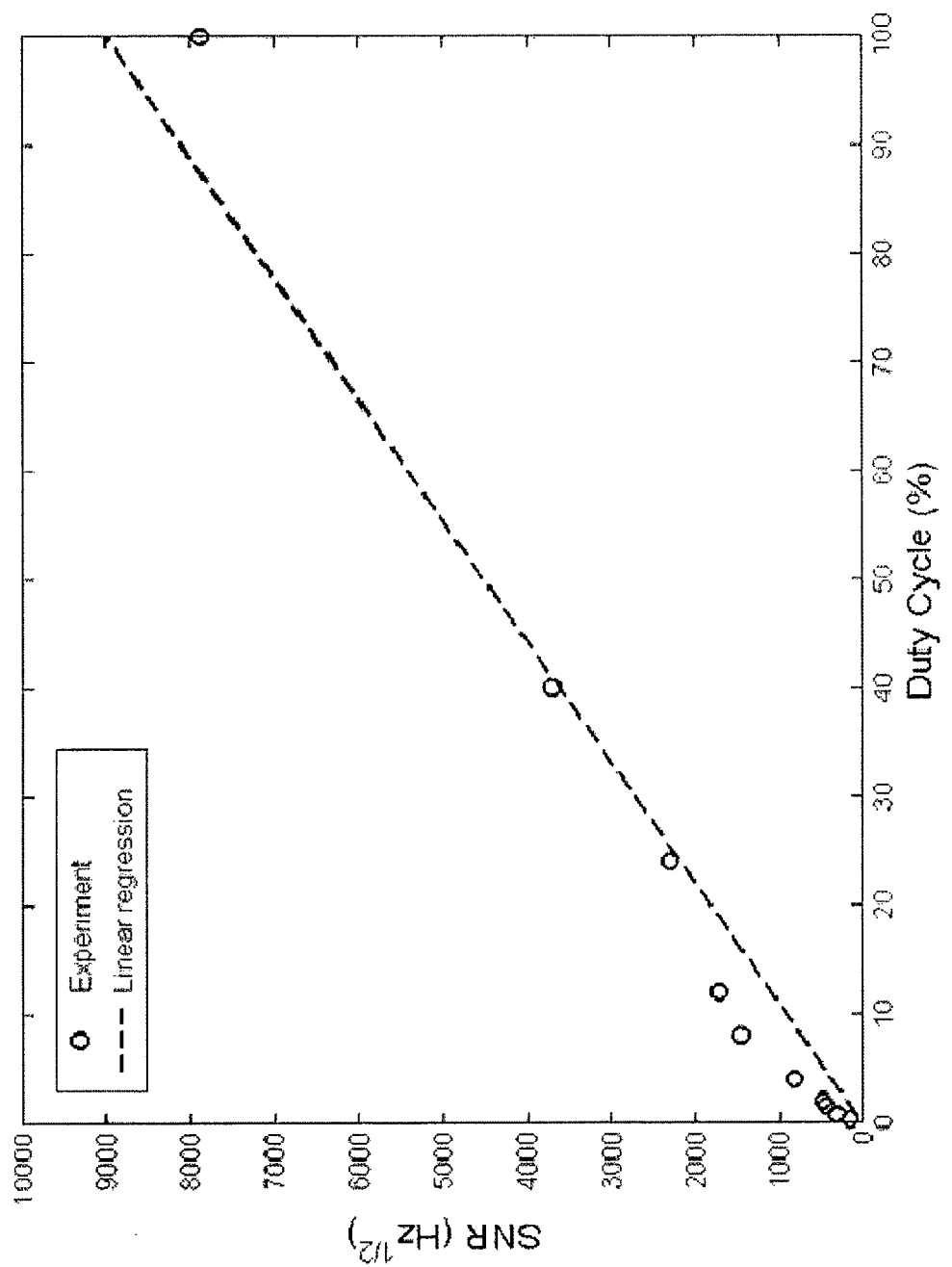
FIG. 28 shows the measured SNR with varying duty cycle of an individual sensing element of the example apparatus of FIG. 10B.

As demonstrated by Eq. 3, the amplitude of the signal scales linearly with the duty cycle, because the energy in the pulse that is being modulated is proportional to the pulse width, while the effect of the duty cycle on noise is minimal when the noise is limited by photodetector thermal noise, as is the case for the example apparatus 10 of FIG. 10B. Therefore, under these experimental conditions, the SNR scales linearly with D. In order to verify this point experimentally, a particular sensor (optically connected to the example apparatus 10) was inserted in the acoustic enclosure and optically disconnected all the other sensing elements 200 of the example apparatus 10. The SNR of the response was measured as the pulse width was increased (keeping the repetition period constant at 80 kHz). The results are shown in FIG. 28. The linear regression shown in the figure has a slope of 0.9. As the duty cycle was varied from 0.4% to ~100%, the measured SNR was found to increase nearly linearly with duty cycle, with a slope close to the expected value of unity.

Figure 29:
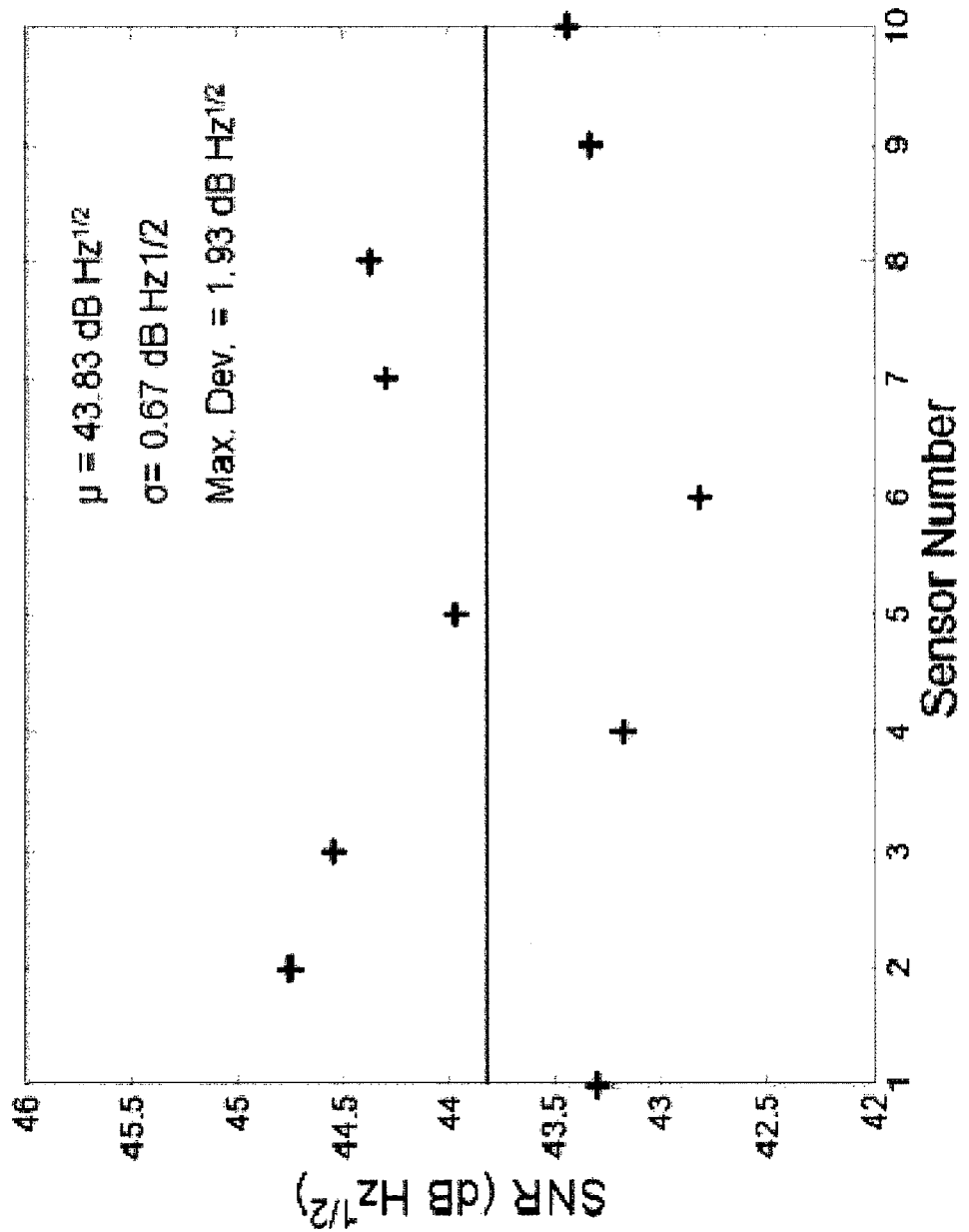
FIG. 29 shows the measured SNR for the ten sensing elements of the example apparatus of FIG. 10B.

The demodulation technique described above in relation to Eq. 3 was performed for each of the ten sensing elements 200 individually while all the sensing elements 200 were connected in the example apparatus 10. During these measurements, the sensing element 200 under test was exposed to the acoustic source (100 mPa at 12.5 kHz) while the other nine sensing elements 200 were isolated from the acoustic signal (outside the acoustic enclosure). The distribution of measured SNRs is shown in FIG. 29. The average SNR for all ten sensing elements 200 at this frequency was measured to be 43.83 dB Hz$^{1/2}$, with a standard deviation 0.67 dB Hz$^{1/2}$ and a maximum deviation of ±0.95 dB Hz$^{1/2}$ from sensing element 200 to sensing element 200. This small deviation in the SNR was helpful towards multiplexing a large number of FP interferometer sensing elements 200 in the example apparatus 10.

To characterize the cross-talk between sensing element responses, the SNR characterization procedure described above was repeated, but the output optical gate to each of the remaining nine pulses adjacent to the one that was being modulated by the acoustic source was switched one at a time. In this way, any undesired signal at the acoustic frequency picked up by an adjacent channel were sought to be identified, as might occur for example as a result of the finite extinction ratio of the modulators, slight temporal overlap between the pulses, etc. No signals exceeding the noise floor (−22 dB) were observed on any of the nine unexcited sensing elements 200, leading to the conclusion that the cross-talk of the example apparatus 10 of FIG. 10B is better than −22 dB. As described previously, the frequency domain demodulation approach enables the demodulation of the output signal when one pulse in a sampling period is amplitude modulated. In order to demodulate the output signal while all the sensing elements 200 are simultaneously excited, e.g., while all the pulses in a period are amplitude modulated, the extinction ratios of the input intensity modulator and the output optical gate can be selected to be high (e.g., >50 dB). For example, this condition on extinction ratio can be achieved by using two modulators connected in series and driven in synchronization with each other.

To demonstrate the polarization insensitivity of the example apparatus 10, a polarization controller was inserted on the fifth rung, between the sensing element 200 and the optical circulator 140, and the SNR for that particular sensing element response was tested for a large number of settings of the polarization controller (e.g., essentially all possible input states of polarization (SOPs)). No variation in SNR were observed as the polarization state was varied. In practical applications, the input SOP incident on a sensing element 200 will likely fluctuate randomly due to external temperature variations, and this test indicates that the example apparatus 10 of FIG. 10B is insensitive to such variations.

To understand the dominant noise contributions on the array output pulses, and the parameters affecting these contributions, the signal returning from each sensing element and the noise associated with it can be modeled. With the gain selected to provide unity transmission as prescribed by Eq. 1, the pulse peak powers $P_s$ returning from all sensing elements are equal and given by:

$$P_s = P_{IN} \frac{C^2 \Gamma_\gamma^2 L_S}{(1-C)^2} \qquad (4)$$

where $P_{IN}$ is the peak power in the pulse input to the array, $\Gamma_\gamma$ is the excess power loss in each circulator, and $L_S$ is the sensor loss. If the optical power incident on a sensor is $P_i$, the reflected power at the highest sensitivity wavelength is $P_i/4$. Therefore, the sensor loss is $L_S$=6 dB.

The total noise in the detected signal generally has five main sources, namely, EDFA noise, signal shot noise, photodetector thermal noise, laser relative intensity noise (RIN), and sensor thermomechanical noise. The ASE signal is a continuous-wave signal, thus it is cumulative and it is the same for all sensing element responses. The total ASE power detected at the photodiode is the sum of the ASE powers generated by all the EDFAs on the two fibers. The ASE signals traverse the same path as the signal pulses and experience no net gain or loss on the individual fibers. They split off the distribution fiber, are reflected at the sensing element, and are coupled into the return fiber to be transmitted to the detector. To calculate the accumulated ASE power at the detector, the total ASE power coupled into a particular rung from all the EDFAs located upstream from this rung on the distribution fiber is calculated. Each of these ASE signals travels down the rung, suffers some power loss at the sensing element, and 60% of the remaining ASE power is coupled onto the return fiber by the coupler at the bottom of the rung. These ten ASE signals can then be added to the total ASE power generated by all the EDFAs on the return fiber. The accumulated ASE calculated by this process can be expressed as:

$$P_{ASE} = \left[ MN_A \Gamma_{Er} \Gamma_\gamma^2 L_S \frac{C^2}{(1-C)} \Gamma_\delta \frac{N(N+1)}{2} + MN_A \Gamma_{Er} N \right] h\nu \Delta\nu \qquad (5)$$

where $N_A = n_{sp}(G-1)$, $n_{sp}$ is the spontaneous emission factor (1.5), M is the number of modes (two for a single-mode fiber), h is the Boltzmann constant, v is the optical frequency, and $\Delta v$ is the optical bandwidth.

At the detector, the ASE signal generates signal-spontaneous (s-sp) beat noise, spontaneous-spontaneous (sp-sp) beat noise, and spontaneous shot noise. The noise equivalent powers (NEP) for each of these terms, expressed in W/√Hz, can be written as follows:

$$NEP_{s\text{-}sp} = \sqrt{2P_S P_{ASE} D/\Delta v}$$

$$NEP_{sp\text{-}sp} = \sqrt{(P_{ASE})^2/\Delta v}$$

$$NEP_{sp}^{sh} = \sqrt{2qP_{ASE}/\rho} \quad (6)$$

where $D = \tau/T$ is the signal duty cycle, q is the electron charge, and $\rho$ is the photodiode responsivity. The intensity noise of the input signal is represented in terms of the RIN of the laser (measured as −140 dB/Hz):

$$NEP_{IN} = DP_{opt}\sqrt{RIN} \quad (7)$$

The signal shot noise is related to the detected optical power as follows:

$$NEP_s^{sh} = \sqrt{2qP_S/\rho}. \quad (8)$$

For high-speed applications, the photodetector thermal noise can be a significant fraction of the total noise. The 1-Gbit/s InGaAs photodiode used in FIG. 10B had an NEP of 20 pW/√Hz, as specified by the manufacturer. The thermomechanical noise of the sensing elements at 12.5 kHz was 0.36 pW/√Hz. Assuming each of these contributions is statistically uncorrelated, the total noise is the square root of the sum of the square of these noise contributions.

Figure 30:
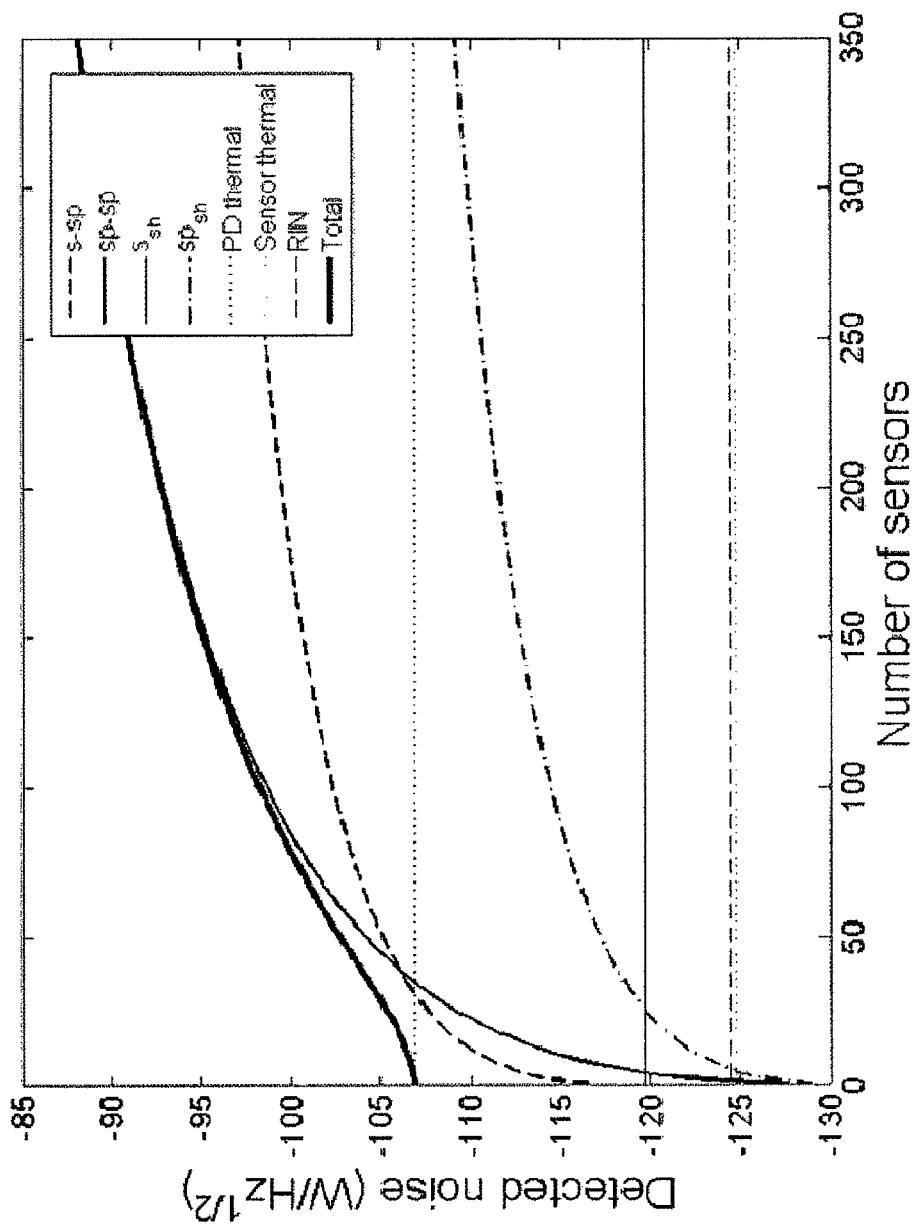
FIG. 30 shows seven noise contributions calculated as functions of the number of sensing elements for the example apparatus of FIG. 10B.

FIG. 30 shows these seven noise contributions calculated as functions of the number of sensing elements 200 for the example apparatus 10. The top curve represents the total noise. FIG. 30 shows that at the input power ($P_{IN} \approx 0.5$ mW), the thermomechanical noise of the sensing elements and the laser intensity noise are negligible. Similarly, the signal shot noise and the ASE shot noise are negligible compared to the signal-spontaneous and spontaneous-spontaneous beat noise terms. For N<30, the thermal noise of the detector dominates the noise floor. The noise is then independent of the input power and of the duty cycle. For 30<N<40, the signal-ASE beat noise becomes dominant. For N>40 the ASE-ASE beat noise starts dominating and becomes a limiting factor on the number of rungs that can be added before the noise is too degraded. The reason why the ASE-ASE beat noise exceeds the signal-ASE beat noise in an apparatus 10 after a certain number of sensing elements is that each additional rung increases the number of EDFAs (e.g., ASE power sources), whereas the signal power is constant.

For the ten sensing elements of FIG. 10B, the model predicts a total noise of −108.1 dBV/√Hz (see FIG. 30), which is in close agreement with the experimentally measured value of −107.5 dBV/√Hz. This noise was experimentally measured by analyzing the array output with the DSA while the acoustic source was off.

When the acoustic source was turned on to a pressure of 0.1 Pa, the average SNR of the example apparatus 10 of FIG. 10B was 43.83 dB $Hz^{1/2}$ at 12.5 kHz. This SNR corresponds to an average MDP at this frequency of ~640 μPa/√Hz, with a maximum deviation of only ±60 μPa/√Hz for all ten sensing elements (MDP=$P_{acoustic}$/SNR). This deviation originates from three factors: (1) the variation in the individual sensing element sensitivities of ±0.3 dB mentioned earlier, (2) the variation in gain between EDFAs, and (3) variations in the components specifications, in particular the coupling ratios, insertion losses, etc. The average MDP of the ten sensing elements operated individually outside the example apparatus 10 was previously measured to be ~6.3 μPa/√Hz at the same frequency. The difference between ~6.3 μPa/√Hz (individual sensing elements) and ~640 μPa/√Hz (sensing elements in the example apparatus 10) likely results from three contributions. The first and foremost is the degradation of the SNR in proportion to the duty cycle (1.6%, or −18 dB) of the input signal in the thermal-noise limit, as experimentally verified in FIG. 28. The second reason is the lower input optical power (by a factor of 4, or −6 dB) used in the example apparatus 10 compared to individual sensing element measurements. The third difference is that in the individual sensing element measurements, the noise was limited by the laser RIN, which was higher by a factor of 3 dB compared to the thermal noise of the detector used in the example apparatus 10. These combined contributions amount to −21 dB, or a 125-fold decrease in SNR, consistent with the measured 100-fold increase in MDP. Note that in this implementation, for practical reasons, the delay lines between each rung were longer than needed. Simply shortening their length by 50%, without making any other change to the system, would improve this budget by 3 dB, thereby reducing the MDP to ~320 μPa/√Hz at 12.5 kHz. However, large-scale sensor array applications generally utilize an acoustically insensitive reference reflector in each rung to monitor the associated losses allocating twice the width of the pulse between the adjacent sensors.

To quantify the maximum number of sensing elements that can be multiplexed with the configuration of FIG. 10B and the minimum detectable pressure, the noise added by the example apparatus 10 when the sensing elements are operated in the example apparatus 10 can be calculated. In particular, the noise figure of the example apparatus 10, defined as the ratio of the SNR of the input and output signals, can be analyzed theoretically. To determine the noise figure, Eqs. 4-8 can be used to calculate the output signal as a function of the input signal, as well as the noise both at the input and output of the example apparatus 10. This system noise results in a degradation of the MDP, and increases with the number of sensing elements.

Figure 31:
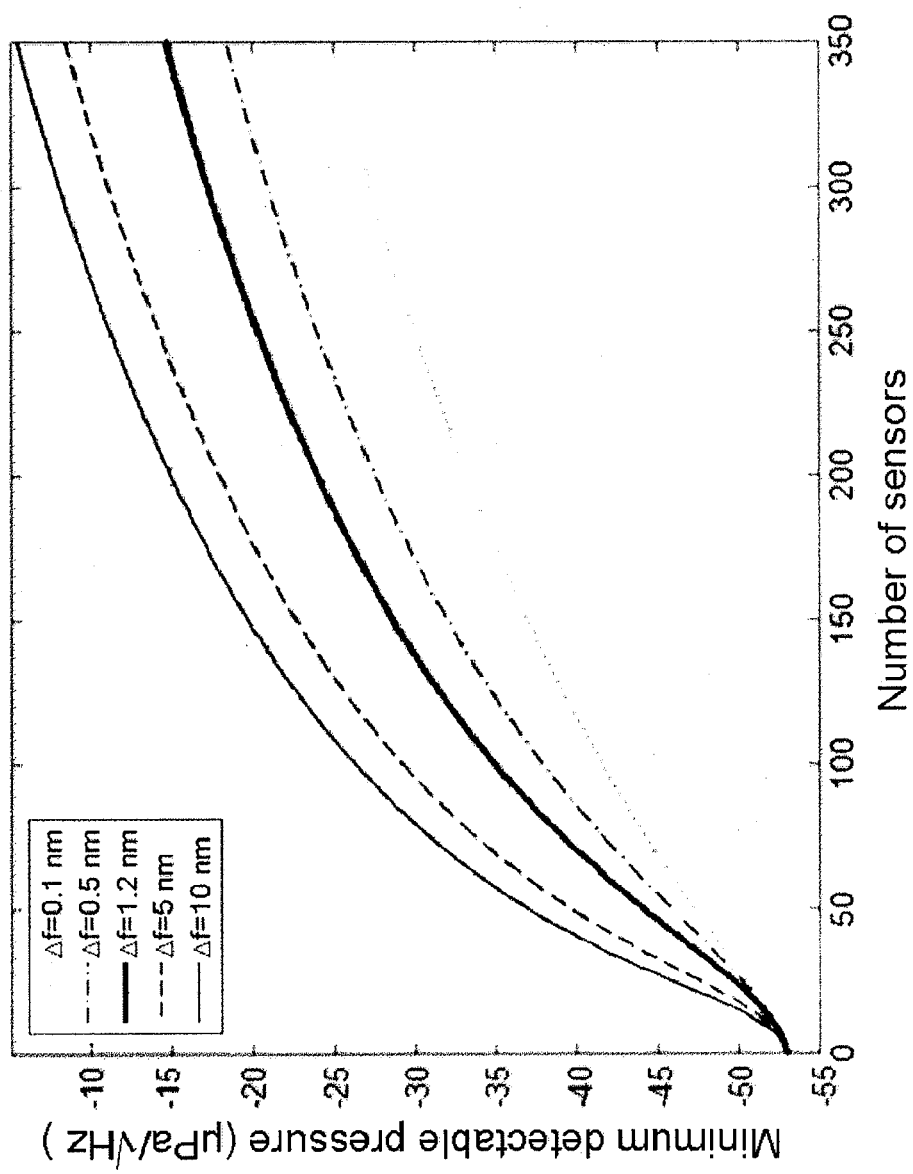
FIG. 31 shows the simulated MDP as a function of the number of sensing elements for bandpass filters with varying optical linewidths for the example apparatus of FIG. 10B.

FIG. 31 shows the dependence of the MDP (on a 10 $\log_{10}$ scale) on the number of multiplexed sensing elements, assuming an optimum duty cycle. FIG. 31 reveals that with a filter bandwidth of 1 nm, an MDP of ~30 mPa/√Hz can be achieved when 350 sensors are multiplexed in the architecture of FIG. 10B. For a higher number of sensing elements, it is possible to incorporate WDM in addition to TDM. For example, for a modest 10-channel system, it is possible to increase the number of multiplexed sensing elements up to ~3500, which is close to oil exploration industry requirements. This figure also quantifies the effect of the bandwidth of the ASE power on the achieved MDP and demonstrates the advantage of utilizing an optical BPF at the output of the example apparatus 10 to reduce the bandwidth of the ASE power that reaches the detector and to minimize the spontaneous-spontaneous beat noise, particularly for systems with large number of sensing elements.

Certain embodiments described herein have been based on or utilize a time-division multiplexing scheme. Persons skilled in the art would recognize that it is also possible to increase the number of sensing elements that can be multiplexed with certain embodiments described herein by incorporating wavelength-division multiplexing in addition to time-division multiplexing.

Various embodiments of the present invention have been described above. Although this invention has been described with reference to these specific embodiments, the descriptions are intended to be illustrative of the invention and are not intended to be limiting. Various modifications and applications may occur to those skilled in the art without departing from the true spirit and scope of the invention as defined in the appended claims.

What is claimed is:

1. An optical apparatus comprising:
at least one optical bus configured to be optically coupled to at least one source of input optical signals, configured to be optically coupled to at least one optical detector, and configured to be optically coupled to a plurality of reflective sensing elements, wherein the at least one optical bus transmits an input optical signal from the at least one source to the plurality of reflective sensing elements such that at least one reflective sensing element of the plurality of reflective sensing elements receives a portion of the input optical signal and reflects at least a portion of the received portion, wherein the at least one optical bus transmits the reflected portion to the at least one optical detector, wherein the at least one optical bus comprises a distribution bus and a return bus, the distribution bus configured to be optically coupled to the at least one source, the distribution bus comprising at least two distribution optical couplers each splitting the input optical signal into a portion transmitted along the distribution bus and a portion transmitted to at least one reflective sensing element of the plurality of reflective sensing elements, the return bus configured to be optically coupled to the at least one optical detector, the return bus comprising at least two return optical couplers that each transmit the reflected portions from multiple reflective sensing elements of the plurality of reflective sensing elements, and wherein at least one reflective sensing element of the plurality of reflective sensing elements is optically coupled to the distribution bus by at least one distribution optical coupler and to the return bus by at least the one distribution optical coupler or is optically coupled to the return bus by at least one return optical coupler and to the distribution bus by at least the one return optical coupler.

2. The apparatus of claim 1, wherein the at least one reflective sensing element is optically coupled to the distribution bus by the at least one distribution optical coupler and is optically coupled to the return bus by at least one return optical coupler and the at least one distribution optical coupler.

3. The apparatus of claim 1, wherein the at least one reflective sensing element is optically coupled to the return bus by the at least one return optical coupler and is optically coupled to the distribution bus by at least one distribution optical coupler and the at least one return optical coupler.

4. The apparatus of claim 1, wherein the at least one optical bus comprises at least one optical circulator optically coupling the at least one reflective sensing element to the distribution bus and to the return bus.

5. The apparatus of claim 1, wherein the at least one optical bus comprises a third optical coupler optically coupling the at least one reflective sensing element to the distribution bus and to the return bus.

6. The apparatus of claim 1, wherein the at least one reflective sensing element comprises at least one sensor.

7. The apparatus of claim 1, wherein the at least one reflective sensing element comprises:
a splitting coupler; and
a plurality of sensors optically coupled to the splitting coupler.

8. The apparatus of claim 1, wherein the at least one optical bus is further configured to be optically coupled to a laser pump source.

9. The apparatus of claim 1, wherein the at least one optical bus comprises at least one optical amplifier positioned such that the portion of the input optical signal is amplified prior to the portion of the input optical signal being received by the at least one reflective sensing element.

10. The apparatus of claim 1, wherein the at least one optical bus comprises at least one optical amplifier positioned to amplify the reflected portion.

11. The apparatus of claim 1, wherein the at least one optical bus comprises a plurality of optical amplifiers positioned such that:
a first portion of the input optical signal is amplified by a first factor,
the first portion of the input optical signal is received by a first reflective sensing element,
the respective reflected portion from the first reflective sensing element is amplified by a second factor,
a second portion of the input optical signal is amplified by a third factor,
the second portion of the input optical signal is received by a second reflective sensing element, and
the respective reflected portion from the second reflective sensing element is amplified by a fourth factor,
wherein the sum of the first factor and the second factor substantially equals the sum of the third factor and the fourth factor.

12. The apparatus of claim 1, wherein the at least one optical bus comprises at least one optical amplifier and at least one optical reflector configured such that the portion of the input optical signal passes through the at least one optical amplifier twice.

13. The apparatus of claim 1, wherein the at least one optical bus comprises at least one optical amplifier and at least one optical reflector configured such that the reflected portion passes through the at least one optical amplifier twice.

14. The apparatus of claim 1, wherein the at least one optical bus comprises at least one optical isolator.

15. The apparatus of claim 7, wherein the at least one reflective sensing element further comprises a plurality of delay elements optically coupled to the splitting coupler and optically coupled to a corresponding sensor of the plurality of sensors.

16. The apparatus of claim 7, wherein the splitting coupler is a wavelength division multiplexer.

17. The apparatus of claim 1, wherein the at least one optical bus comprises at least one optical filter positioned such that the reflected portion passes through the at least one optical filter prior to being received by the at least one optical detector.

18. A method for configuring an optical bus to be optically coupled to a plurality of reflective sensing elements, the method comprising:
providing at least one optical bus comprising a plurality of optical couplers,
wherein the at least one optical bus is configured to be optically coupled to at least one source of input optical signals, configured to be optically coupled to at least one optical detector, and configured to be optically coupled to a plurality of reflective sensing elements by the plurality of optical couplers;

wherein the at least one optical bus transmits an input optical signal from the at least one source to the plurality of reflective sensing elements such that at least one reflective sensing element of the plurality of reflective sensing elements receives a portion of the input optical signal and reflects at least a portion of the received portion;

wherein the at least one optical bus transmits the reflected portion to the at least one optical detector; and selecting coupling ratios of the plurality of optical couplers to reduce a noise figure of the at least one reflective sensing element.

19. The method as defined in claim 18, further comprising amplifying the portion of the input optical signal to compensate for losses in the at least one optical bus.

20. The method as defined in claim 18, further comprising amplifying the reflected portion to compensate for losses in the at least one optical bus.

21. The method as defined in claim 18, further comprising:
amplifying a first portion of the input optical signal by a first factor,
receiving the first portion of the input optical signal by a first reflective sensing element,
amplifying the respective reflected portion from the first reflective sensing element by a second factor,
amplifying a second portion of the input optical signal by a third factor,
receiving the second portion of the input optical signal by a second reflective sensing element, and
amplifying the reflected portion from the second reflective sensing element by a fourth factor;
wherein the sum of the first factor and the second factor substantially equals the sum of the third factor and the fourth factor.

22. The method as defined in claim 18, further comprising:
amplifying the portion of the input optical signal by an optical amplifier,
reflecting at least a portion of the portion of the input optical signal by an optical reflector, and
amplifying the at least a portion of the portion by the optical amplifier again.

23. The method as defined in claim 18, further comprising:
amplifying the reflected portion by an optical amplifier,
reflecting at least a portion of the reflected portion by an optical reflector, and
amplifying the at least a portion of the reflected portion by the optical amplifier again.

24. The method as defined in claim 18, further comprising filtering out white noise.

25. A method for configuring an optical bus to be optically coupled to a plurality of reflective sensing elements, the method comprising:
providing at least one optical bus comprising a distribution bus and a return bus;
wherein the at least one optical bus is configured to be optically coupled to at least one source of input optical signals, configured to be optically coupled to at least one optical detector, and configured to be optically coupled to a plurality of reflective sensing elements;
wherein the at least one optical bus transmits an input optical signal from the at least one source to the plurality of reflective sensing elements such that at least one reflective sensing element of the plurality of reflective sensing elements receives a portion of the input optical signal and reflects at least a portion of the received portion;
wherein the distribution bus is configured to be optically coupled to the at least one source, the distribution bus comprising at least two distribution optical couplers each splitting the input optical signal into a portion transmitted along the distribution bus and a portion transmitted to at least one reflective sensing element of the plurality of reflective sensing elements, the return bus configured to be optically coupled to the at least one optical detector, the return bus comprising at least two return optical couplers that each transmit the reflected portions from multiple reflective sensing elements of the plurality of reflective sensing elements, and wherein at least one reflective sensing element of the plurality of reflective sensing elements is optically coupled to the distribution bus by at least one distribution optical coupler and to the return bus by at least the one distribution optical coupler or is optically coupled to the return bus by at least one return optical coupler and to the distribution bus by at least the one return optical coupler;
wherein the at least one optical bus transmits the reflected portion to the at least one optical detector; and
selecting coupling ratios of the at least two distribution optical couplers and the at least two return optical couplers to reduce a noise figure of the at least one reflective sensing element.

* * * * *